United States Patent
Adler et al.

(10) Patent No.: US 11,430,118 B2
(45) Date of Patent: Aug. 30, 2022

(54) METHODS AND SYSTEMS FOR PROCESS CONTROL BASED ON X-RAY INSPECTION

(71) Applicant: Bruker Nano, Inc., Santa Barbara, CA (US)

(72) Inventors: David Lewis Adler, San Jose, CA (US); Scott Joseph Jewler, San Jose, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 16/924,663

(22) Filed: Jul. 9, 2020

(65) Prior Publication Data

US 2021/0011177 A1    Jan. 14, 2021

Related U.S. Application Data

(60) Provisional application No. 62/873,752, filed on Jul. 12, 2019.

(51) Int. Cl.
  *G06T 7/00* (2017.01)
  *G06N 20/00* (2019.01)
  (Continued)

(52) U.S. Cl.
  CPC .......... *G06T 7/0014* (2013.01); *G01N 23/04* (2013.01); *G01N 23/043* (2013.01);
  (Continued)

(58) Field of Classification Search
  CPC ........ G01T 1/20; G01N 23/04; G01N 23/043; G01N 23/083; G01N 23/18; H01L 21/67;
  (Continued)

(56) References Cited

U.S. PATENT DOCUMENTS

2003/0118149 A1    6/2003  Okuda
2005/0207655 A1    9/2005  Chopra
(Continued)

FOREIGN PATENT DOCUMENTS

| KR | 20180129280 A | 12/2018 |
| WO | WO 2018003018 A1 | 1/2018 |
| WO | WO 2018217646 A1 | 11/2018 |

OTHER PUBLICATIONS

International Search Report and Written Opinion for International Application No. PCT/US2020/041514.
(Continued)

*Primary Examiner* — Jurie Yun
(74) *Attorney, Agent, or Firm* — Boyle Fredrickson S.C.

(57) ABSTRACT

In one embodiment, an X-ray inspection system may capture one or more X-ray images for samples of interest processed by a first tool. The X-ray inspection system may be inline with the first tool and have an inspection speed of 300 mm$^2$ per minute or greater. The system may determine, in real-time, metrology information related to the samples of interest based on the X-ray images. The metrology information may indicate that a sample parameter associated with the samples of interest is outside of a pre-determined range. The system may provide instructions or data to one or more of the first tool or one or more second tools to adjust process parameters associated with the respective tools based on metrology information. The adjusted process parameters may reduce a processing error probability, of the respective tool for processing subsequent samples, related to the sample parameter being outside of the pre-determined range.

20 Claims, 7 Drawing Sheets

(51) Int. Cl.
  *G06T 5/00* (2006.01)
  *G01N 23/04* (2018.01)
  *G01T 1/20* (2006.01)
  *H05K 1/11* (2006.01)
  *H05K 3/40* (2006.01)
  *H01L 21/67* (2006.01)
  *G06F 30/398* (2020.01)
  *G01N 23/083* (2018.01)
  *G01N 23/18* (2018.01)
  *G06K 9/62* (2022.01)
  *G06F 119/18* (2020.01)
  *G06F 115/12* (2020.01)

(52) U.S. Cl.
  CPC ........... *G01N 23/083* (2013.01); *G01N 23/18* (2013.01); *G01T 1/20* (2013.01); *G06F 30/398* (2020.01); *G06K 9/6256* (2013.01); *G06K 9/6267* (2013.01); *G06N 20/00* (2019.01); *G06T 5/007* (2013.01); *G06T 7/0012* (2013.01); *H01L 21/67288* (2013.01); *H05K 1/115* (2013.01); *H05K 3/4038* (2013.01); *G01N 2223/04* (2013.01); *G01N 2223/401* (2013.01); *G01N 2223/426* (2013.01); *G01N 2223/505* (2013.01); *G01N 2223/6466* (2013.01); *G06F 2115/12* (2020.01); *G06F 2119/18* (2020.01); *G06T 2207/10081* (2013.01); *G06T 2207/10116* (2013.01); *G06T 2207/20024* (2013.01); *G06T 2207/20081* (2013.01); *G06T 2207/20208* (2013.01); *G06T 2207/30004* (2013.01)

(58) Field of Classification Search
  CPC ...... H01L 21/67288; G06K 9/00; G06K 9/62; G06K 9/6256; G06K 9/6267; G06N 20/00; G06N 20/20; G06T 5/007; G06T 7/001; G06T 7/0002; G06T 7/0014
  See application file for complete search history.

(56) References Cited

U.S. PATENT DOCUMENTS

| | | |
|---|---|---|
| 2015/0270023 A1 | 9/2015 | Adler |
| 2017/0200524 A1 | 7/2017 | Adler |
| 2018/0293721 A1 | 10/2018 | Gupta |
| 2018/0342051 A1 | 11/2018 | Sezginer |
| 2019/0212281 A1 | 7/2019 | Shchegrov |

OTHER PUBLICATIONS

International Search Report and Written Opinion for International Application No. PCT/US2020/041520.

5000

```
┌─────────────────────────────────────────────────────────┐
│ Capture one or more X-ray images for one or more samples│
│ of interest that have been processed by a first tool,   │
│ wherein the X-ray inspection system is inline with the  │
│ first tool, and wherein the X-ray inspection system has │
│ an inspection speed of 300 square mm per minute or      │
│ greater                                                 │
│ 510                                                     │
└─────────────────────────────────────────────────────────┘
```

Capture one or more X-ray images for one or more samples of interest that have been processed by a first tool, wherein the X-ray inspection system is inline with the first tool, and wherein the X-ray inspection system has an inspection speed of 300 square mm per minute or greater
510

Determine, in real-time, metrology information related to the one or more samples of interest based on the one or more X-ray images, wherein the metrology information indicates that a sample parameter associated with the one or more samples of interest is outside of a pre-determined threshold range associated with the sample parameter
520

Provide, responsive to the real-time determination that the sample parameter is outside of the pre-determined threshold range, instructions to one or more of the first tool or one or more second tools to adjust one or more process parameters associated with the respective tools based on the metrology information related to the one or more samples of interest, wherein the adjusted process parameters reduces a processing error probability, of the respective tool for processing subsequent samples, related to the sample parameter being outside of the pre-determined range
530

FIG. 5

METHODS AND SYSTEMS FOR PROCESS CONTROL BASED ON X-RAY INSPECTION

PRIORITY

This application claims the benefit under 35 U.S.C. § 119(e) of U.S. Provisional Patent Application No. 62/873,752, filed 12 Jul. 2019, which is incorporated herein by reference.

TECHNICAL FIELD

This invention relates to process control based on X-ray inspection results.

BACKGROUND

Integrated circuits may be manufactured to include 3D or 2.5D structures. The inspection techniques using optical photons or electrons to inspect silicon wafers cannot be used to inspect 3D and 2.5D IC packages because they do not penetrate through the ICs, interposers, or Cu—Cu die to die bonding sufficiently to provide an internal view of the packaged ICs. Optical inspection methods are also not capable of performing inspection or metrology for partially packaged components, a critical requirement for process control. Since X-rays can penetrate through many layers of packaging, X-ray inspections may provide an internal view of the assembled device.

However, existing X-ray systems lack sufficient resolution and imaging speed to meet the needs for high-resolution, high-throughput IC and electronic packaging inspection. For example, traditional computed tomography (CT) using X-rays may need to take many slices of X-ray images of the inspected objects and use the large number of slices to construct 3D model of the object, and therefore is very slow and not suitable for inspecting integrated circuits.

SUMMARY OF PARTICULAR EMBODIMENTS

Particular embodiments described herein relate to systems and methods for providing feedback or/and feedforward information to other tools of a manufacturing process based on X-ray inspection results of the samples that are processed or will be processed by these tools. The X-ray inspection system may capture X-ray images of one or more samples processed by a first tool during one or more steps of the manufacturing process. The system may use computer vision algorithms or machine-learning models to analyze the X-ray images to generate metrology information related to the inspected samples. The system may identify defects in the inspected samples or/and parameter deviations from pre-determined threshold ranges (e.g., as defined by specification requirements) based on the metrology information. Then, the system may provide feedback information (e.g., instructions or data generated based on metrology information, defect information, sample parameter information) to the first tool and cause the first tool to adjust one or more process parameters for processing subsequent samples. The first tool with adjusted process parameters may have a lower probability for processing or producing samples that have defects or parameter deviations from the pre-determined threshold ranges. The system may provide feedforward information (e.g., instructions or data generated based on metrology information, defect information, sample parameter information) to a second tool that will be used in one or more subsequent steps of the manufacturing process and cause the second tool to adjust one or more process parameters. The second tool with the adjusted process parameters may have a low probability for processing or producing samples that have defects or parameter deviations from the pre-determined threshold ranges. The X-ray inspection system may be inline or/and in situ with the first and second tools used for processing the samples in one or more steps of the manufacturing process. The X-ray inspection system may inspect the samples and provide feedback/feedforward information to these tools in real-time to adjust the corresponding process parameters.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter that can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 illustrates an example method for providing feedback information to a tool based on X-ray inspection results of samples processed by that tool.

Figure 1A:
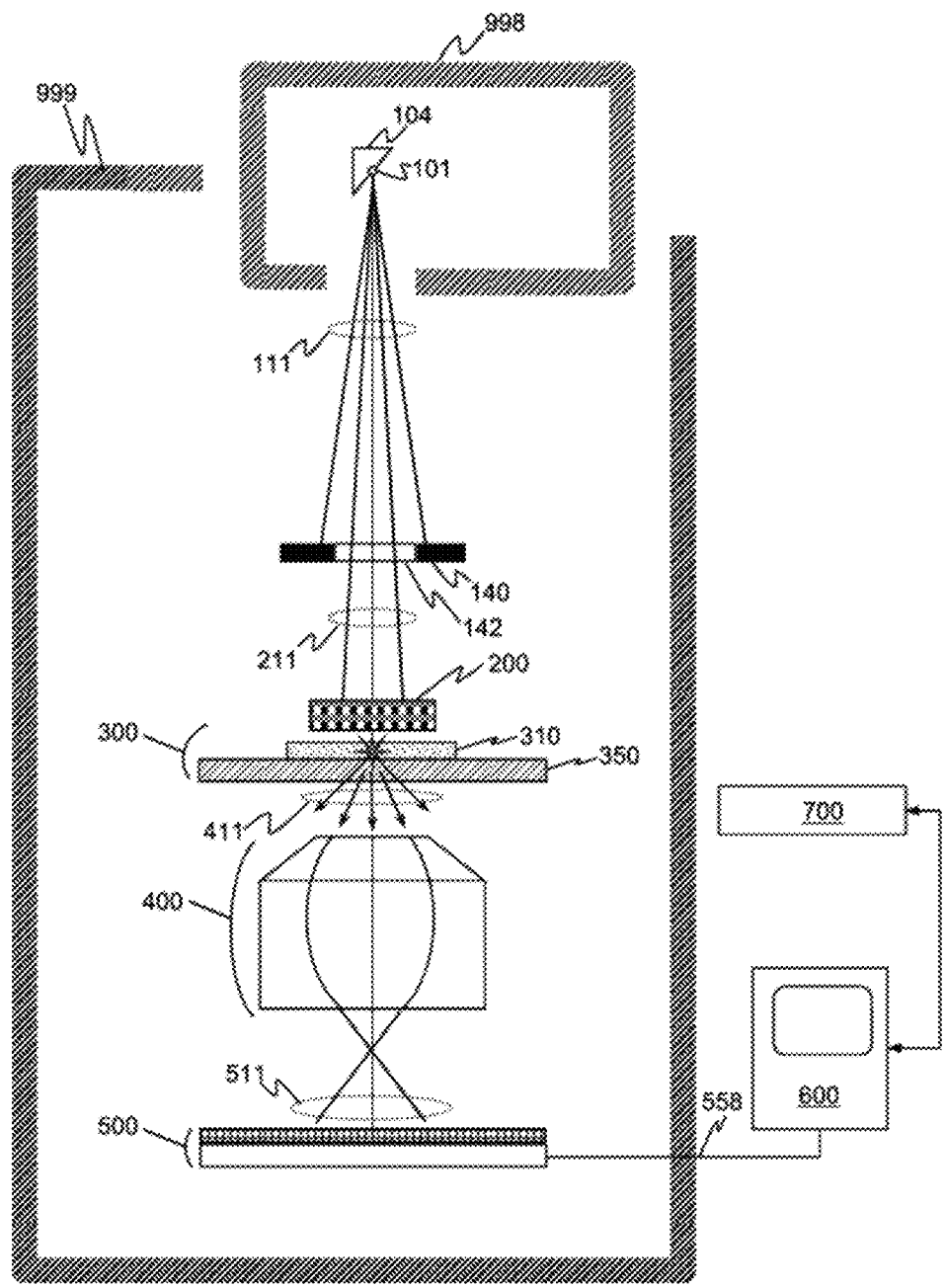
FIG. 1A illustrates an example automatic high-speed X-ray inspection system.

Note: Elements shown in the drawings are meant to illustrate the functioning of the invention and have not been drawn to scale.

DESCRIPTION OF EXAMPLE EMBODIMENTS

Automated High-Speed X-Ray Inspection System
  X-Ray System Framework

The system and methods disclosed herein are related to a system or the use of a system that illuminates an object to be examined or inspected with X-rays, converts X-rays to visible (or near-visible) photons, forms an image of the visible (or near-visible) photons, and then converts the image into an electronic form. As such, the various embodiments of this X-ray image formation system will be presented first, followed by the various embodiments of methods and systems that utilize the X-ray imaging system.

Although many kinds of objects can be examined or inspected using the apparatus disclosed here, it is expected to be especially suitable for the examination and inspection of integrated circuit wafers and packaging assemblies. One example of these are silicon interposers, comprising silicon with multiple TSVs, but the invention can also be used for the inspection of an integrated circuit (IC) itself, a silicon interposer, a silicon dioxide interposer, a printed circuit board (PCB) with or without ICs already installed, a 3D IC package or assembly, a 2.5D IC package or assembly, a multi-chip module (MCM), a system-in-package (SIP) and other electronic microdevices or portion thereof that comprise microscopic structures. These may be examined as incoming materials, completed products, or as partially manufactured objects at any stage of their manufacture for the purpose of metrology, process control, inspection, or yield management.

Non-electronic devices with micro- or nano-structures, such as magnetic recording media, photonic structures and photonic crystals, metamaterials, etc., can also be examined and inspected using this invention. Capacitive sensors, such as fingerprint sensors, can also be examined. A particularly attractive feature of the apparatus is that it is possible to make non-destructive, high-resolution observations and measurements of features within an object that cannot otherwise be seen using electrons or optical photons, as are used in conventional metrology and inspection tools.

In general, objects suitable for use with this invention will comprise at least one flat side. Examples include: electronic circuits on semiconductor wafers, parts of wafers or selected areas on wafers; integrated circuit chips, dice, assemblies, packages, or portions thereof; micro-fluidic devices; micro-electro-mechanical systems (MEMS), including accelerometers, gyros, magnetic and capacitive sensors and the like; photonic devices, particularly those fabricated using planar waveguides; biological tissues, including stained samples; photomasks or templates for printing or fabricating any of the above mentioned devices; and solar cells, parts thereof or parts pertaining to solar cells. Other objects without flat sides may be observed and inspected as well, but the image quality may not be uniform for objects of irregular dimensions.

In particular embodiments, the X-ray inspection system as described in this disclosure may be a high-speed X-ray inspection system. In particular embodiments, the high-speed X-ray inspection system may have a higher measurement/inspection speed than traditional X-ray systems (e.g., 100 times faster than traditional X-ray systems). As an example and not by way of limitation, the high-speed X-ray inspection system may be capable of inspecting electronic components or devices with an image collection time of approximately 33 milliseconds. In particular embodiments, the X-ray inspection system as described in this disclosure may be an automated X-ray inspection system. In particular embodiments, the automated X-ray inspection system may include one or more computers or controllers and instructions stored in one or more computer media. The automated measurement process of the automated X-ray inspection system may be controlled by the computers or controllers by executing corresponding instructions. The automated measurement process of the automated X-ray inspection system may not need interventions from human operators and may be automatically performed following particular procedures.

In particular embodiments, the X-ray inspection system as described in this disclosure may use one more artificial intelligence (AI) modules and/or machine-learning models. In particular embodiments, the artificial intelligence (AI) modules may be or include any suitable methods, processes, and/or algorithm performed by one or more computing systems. In particular embodiments, the machine-learning models may be or include, for example, but are not limited to, a rule-based algorithm, a random forest model, a neutral network or any suitable machine-learning models. In particular embodiments, the X-ray inspection system as described in this disclosure may perform real-time measurements to one or more processes performed by another system (e.g., a drilling machine, a bonding tool, an assembling tool, or any suitable tools). In particular embodiments, the term "real-time measurements" may refer to measurements performed by the X-ray inspection system in parallel to an associated process (e.g., a drilling process, an assembling process, a bonding process, or any suitable processes) without slowing down the associated process. The X-ray inspection system may perform measurements and provide feedback to the systems performing the associated process in a speed higher than or equal to the speed of the associated process.

In particular embodiments, the X-ray inspection system as described in this disclosure may perform in situ and/or inline measurements with one or more other systems or tools (e.g., a drilling machine, a bonding tool, an assembling tool, or any suitable tools). In particular embodiments, the term "in situ measurements" may refer to measurements performed by the X-ray inspection system which is integrated with other systems. For example, the X-ray inspection system may be integrated into a drilling machine and perform in situ measurements to monitor the drilling process of the drilling machine. The in situ measurements may be automatically controlled by one or more computing systems coordinating the X-ray inspection system and the drilling machine. In particular embodiments, the term "inline measurements" may refer to measurements performed by the X-ray inspection system within the same process (e.g., a drilling process, an assembling process, a bonding process, or any suitable processes) performed by another system (e.g., a drilling machine, a bonding tool, an assembling tool, or any suitable tools). For example, during an assembling process performed by an assembling tool, the X-ray system may inspect the assembled components or devices during one or more steps of the assembling process. The components or devices may be automatically transferred from the assembling tool to the X-ray inspection system (e.g., by a robot arm) or may be manually transferred from the assembling tool to the X-ray inspection system (e.g., by a human operator). The X-ray inspection system may provide feedback information automatically to the assembling tool or to a human operator.

X-Ray Imaging System

FIG. 1A illustrates an example automatic high-speed X-ray inspection system 1000A. An X-ray emitter 101 emits X-rays 111. These X-rays are then shaped into a collimated X-ray beam 211, in some embodiments using distance from the emitter 101 and a plate 140 with an aperture 142. This collimated X-ray beam 211 then illuminates an object 200 to be examined. The X-rays that are transmitted through the object 200 illuminate a scintillator assembly 300 comprising a scintillator 310 and, in some embodiments, a support 350 for the scintillator. The scintillator 310 absorbs a portion of the X-rays and releases some of the energy so absorbed with the emission of visible photons 411.

Using an optical system 400, a magnified image 511 of the visible photons 411 emitted by the scintillator is formed on an image detector 500. The image detector 500 converts the intensity of the magnified image 511 to an electronic signal. The image detector 500 can comprise an electronic sensor, such as a charge-coupled device (CCD), or another image sensor known to those skilled in the art. The electronic signal is transmitted to a system of electronics 600 that, in some embodiments can display the image results, and in some embodiments can store the image results and/or perform image processing algorithms on the image results in conjunction with a computer system 700.

For any source emitting ionizing radiation such as X-rays, it is often wise to provide shielding 998 around the X-ray source 100, and in some situations legally required for operation. Such shielding 998 can be a simple enclosure of shaped sheets of lead metal, or a more intricate design fabricated from any of a number of X-ray absorbing materials, such as lead-doped glass or plastic, that will be known to those skilled in the art. Shielding is desirable to keep random X-rays, either directly from the emitter 101 or reflected from some other surface, from causing unwanted effects, particularly spurious signals in the various electronic components used to control the system.

Likewise, for some embodiments, additional shielding 999 around the beam path may also be desired, and in some cases be legally required for operation. Such additional shielding 999 can be a simple enclosure of shaped sheets of lead metal, or a more intricate design fabricated from any of a number of X-ray absorbing materials such as lead-doped glass or plastic, that will be known to those skilled in the art. Additional shielding 999 is desirable to keep random X-rays, either directly from the emitter 101 or reflected from some other surface, from causing unwanted effects, particularly spurious signals in the various electronic components used to control the system.

Because certain image detectors 500 such as those comprising CCD sensors can be particularly sensitive to X-ray exposure, in some embodiments a portion of the scintillator assembly 300 can also be fabricated in whole or in part using a material, such as a lead-doped glass, which absorbs X-rays while transmitting the visible photons 411 emitted by the scintillator. Other embodiments comprising a system design that places the image sensor out of the X-ray beam path, as will be disclosed in more detail later in this Application, may also be used if additional isolation from X-rays is desired.

Figure 1B:
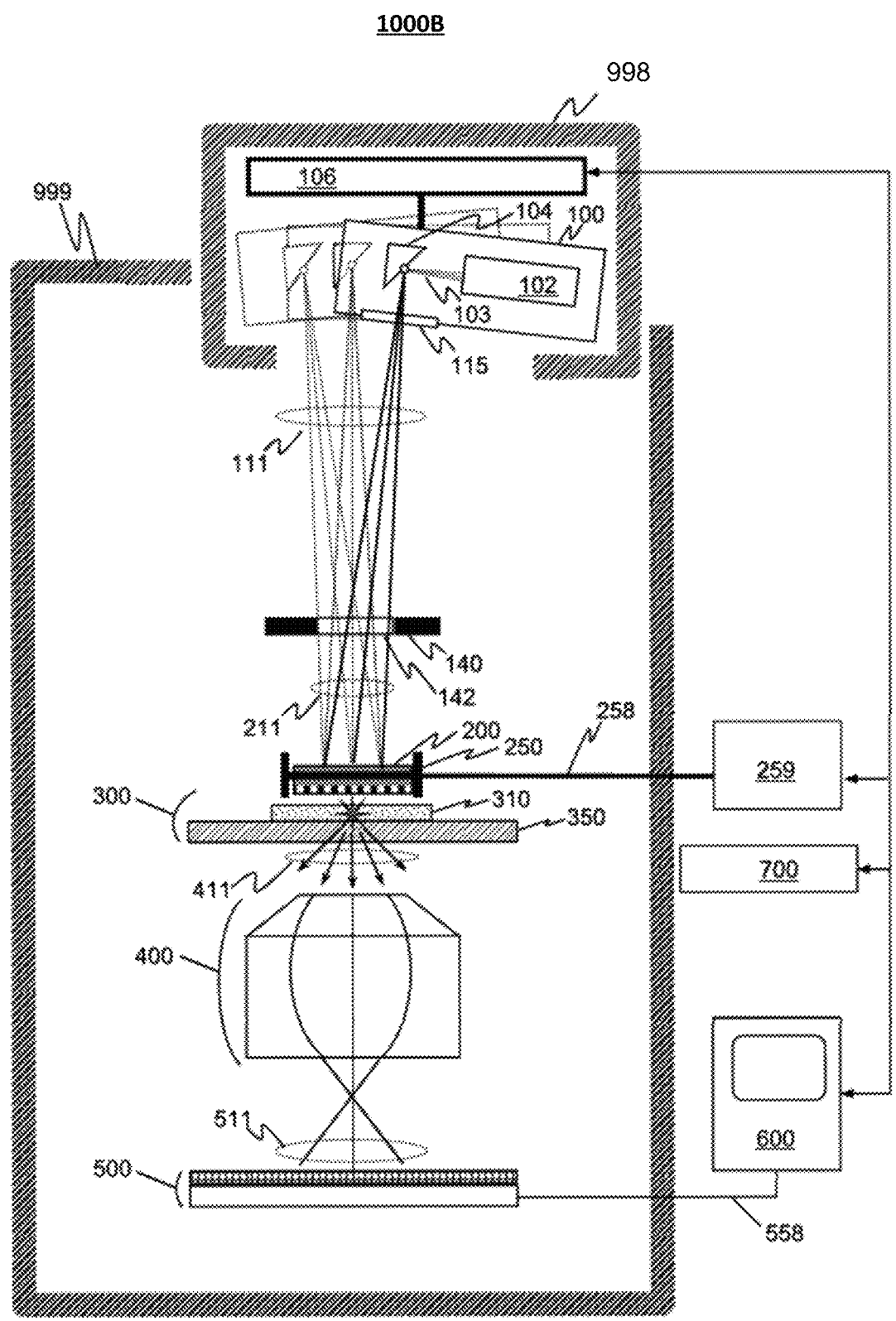
FIG. 1B illustrates an example X-ray inspection system with movable X-ray source with respect to the inspected object for generating X-ray images at different directions.

FIG. 1B illustrates an example X-ray inspection system 1000B with movable X-ray source with respect to the inspected object for generating X-ray images at different directions. As an example and not by way of limitation, the X-ray system may include a mount 106 that can move the position of the X-ray source 100 relative to the object 200, thereby changing the angle of incidence of the X-ray beam on the object. The mount 106 can be designed to allow the X-ray source 100 to swing in the x-z plane, in the y-z plane, or any other combination of axes. The source can also be moved along the z-axis to move the X-ray source 100 closer to the object 200. This may have the effect of making the beam brighter, increasing signal strength, at the cost of having an X-ray beam that is less collimated, reducing resolution. This effect may be reduced or eliminated by reducing the spot size of the X-ray source.

Motion of the X-ray source 100 using the mount 106 can be controlled by the computer system 700 several ways. In some embodiments, the source mount 106 may move the X-ray source 100 to a fixed location to allow an image to be captured. In some embodiments, the mount 106 can move the X-ray source 100 continuously as images are gathered, allowing the dynamic change of X-ray intensity as transmitted through the object 200 to be recorded as a function of illumination angle. In some embodiments, the X-ray emitter 101 can be moved to at least 10 degrees off the normal incidence angle. In some embodiments, further adjustment of the angle of incidence of the X-ray beam 211 on the object 200 can be achieved by coordinating the motion of the X-ray source 100 using the source mount 106 with the motion of the object 200 using the object mount 250. This coordination can be done manually or using the computer system 700. In some embodiments, the shielding 998 will be designed to enclose the X-ray source 100 and the source mount 106. In other embodiments, the shielding 998 can be designed to only enclose the X-ray source, with the mount 106 designed to move the shielding 998 as it moves the X-ray source 100. In some embodiments of the invention, multiple X-ray sources may be used to produce images with different angles of incidence. The X-ray sources may be fixed in space or moveable and may be operated sequentially or simultaneously. They can be operated manually or controlled by one or more computer systems 700.

In particular embodiments, the X-ray imaging system described in this disclosure may be an automated high-speed and high-resolution X-ray imaging system for generating X-ray images of electronic devices. In particular embodiments, the automated high-speed X-ray inspection system may include X-ray detectors with a high sensitivity for X-ray radiation, a very large number of grayscale levels (e.g., 10,000+ grayscale levels) with a large dynamic range, and a large number of pixels (e.g., greater than 29 megapixels) for generating high resolution images. In particular embodiments, the automated high-speed X-ray inspection system may have a spatial resolution of lower than 2 μm, a field of view of 12 mm×12 mm, and a throughput or inspection speed greater than or equal to 300 mm$^2$ per minute. In particular embodiments, the automated high-speed X-ray inspection system may have a throughput or inspection speed greater than or equal to 1000 mm$^2$ per minute. In particular embodiments, the automated high-speed X-ray inspection system may have a throughput or inspection speed greater than or equal to 3000 mm$^2$ per minute. More details about the X-ray system may be found in U.S. patent application Ser. No. 15/470,726, filed 27 Mar. 2017, which is incorporated herein by reference.

Overview Feedback and Feedforward Based on X-Ray Inspection

Problems Being Solved

In the electronics industry, cross-section X-ray images may be used for inspecting and analyzing electronic parts or devices. For example, a computational tomography (CT) X-ray imaging technique may be used to generate cross-section images of inspected parts. However, this technique requires generating a large quantity of images (e.g., images of many angles and slices), and therefore is relatively slow. Moreover, for CT imaging, the positions of the inspected sample, the X-ray source, and the X-ray detector must be precisely controlled to minimize distortion in the cross section images. For high resolution X-ray CT imaging, the distance between the inspected sample and the X-ray source may need to be minimized and the sample may need to be rotated to create images from multiple angles. All these limitations may limit the size of the samples that can be inspected and the inspection speed of the inspection process. Furthermore, while the CT imaging may be acceptable for some failure analysis applications, it is not suitable to be used by electronics manufacturers to perform inline inspections during the manufacturing process due to the lengthy processing time and the limitation on sample size. As a result, the limitations of the CT imaging technique severely restrict its applications for inline inspection and in-situ monitoring of electronics manufacturing process.

In addition, traditional methods for inspecting electronics using X-ray images may rely on human operators to manually inspect X-ray images and identify defective parts. While some defects in X-ray images could be recognized by human operators, some other defects with subtle features could be difficult or impossible for human operators to recognize. Furthermore, manual inspection of X-ray images could be very slow and not suitable for high volume inspection applications. As electronics assemblies become more complex, the ability to screen out non-compliant products in the manufacturing process becomes more critical for the product quality control. Allowing products with potential defects to enter the supply chain could create serious concerns for the long-term product reliability and safety.

Furthermore, flip chip interconnects are widely used to connect semiconductor devices to silicon and organic interposers and/or substrates. To achieve higher levels of integration of semiconductor devices, the distance between electrical contacts has been continuously reduced. At the same time, more and thinner layers of devices may be stacked vertically. Thermal expansion mismatch between layers may lead to warpage and misalignment between layers during manufacturing process and may lead to defective or non-reliable connections between layers. Currently existing manufacturing technologies of electronic products do not have the continuous feedback loop for adjusting the manufacturing process for quality control. For example, existing manufacturing process may allow electronic parts to be inspected based on production batch. When the manufacturing process has some problems (e.g., component assemblies are off alignment), a large number of defective products (e.g., 100+ thousands) may be manufactured before problems are noticed through the batch-based inspection. If some defective parts are identified from a particular batch, the manufacturing process may not be adjusted until next product batch and the current product batch that includes defective parts may need to be discarded or re-processed as defective parts. As a result, the existing manufacturing processes could be very wasteful and costly when encountering problems that cause defective parts to be produced. Furthermore, existing technologies for inspecting electronic parts cannot effectively evaluate the healthiness of compliant parts. In some scenarios, compliant parts that have passed the electrical tests or/and optical inspections may have reduced reliability and different levels of healthiness due to the parameter variations in the manufacturing process. Products having these compliant but non-reliable parts may have a short life, and a higher failure rate, even though the products may work well initially. As a result, the product reliability and safety in field applications may be negatively affected.

Solution Summary

In particular embodiments, the automated high-speed X-ray inspection system described in this disclosure may inspect product samples at a high speed that can match the speed of the manufacturing tool for manufacturing or processing these samples. Particular embodiments of the system may inspect the samples inline or/and in situ with the manufacturing process of these electronic parts or devices and provide feedback information in real-time to the manufacturing tool when one or more defects are identified in the inspected samples or one or more parameters of inspected samples deviate from specification requirements. Particular embodiments of the system may inspect the product samples and provide feedforward information to one or more tools used in subsequent processes for manufacturing or processing these samples. Particular embodiments of the system may use computer vision techniques or/and machine-learning models to automatically inspect these samples, generate metrology information, and feedback/feedforward information. The tools that receive the feedback or feedforward information may adjust one or more parameters associated with the manufacturing process and have a lower probability for producing products with defects or parameters deviating from specification requirements.

Benefits and Advantages

By using computer vision techniques and machine-learning models to analyze X-ray images, particular embodiments of the system may eliminate the need for human operators to manually inspect X-ray images to identify the presence of defects. Particular embodiments of the system may improve the detection rate and accuracy for identifying defects in the inspected samples and reduce over rejections. For example, the system may effectively and accurately detect some defects that are not detectable by the human eye because of limited capability in discerning a large number of grayscale levels by the human eye. Furthermore, using the automated processes and the machine-learning models to analyze X-ray images, particular embodiments of the system may reduce the cost of inspections to a very low level (e.g., 2 cents per part), increase the inspection speed (e.g., 100+ times faster than traditional CT imaging systems), and improve the coverage and repeatability of inspection. Particular embodiments of the system may include one or more X-ray detectors with high sensitivity and high resolution for generating X-ray images. For example, the X-ray images may have many more pixels (e.g., 12+ megapixels, 29+ megapixels) than traditional CT systems (e.g., 1-2 megapixels). Each X-ray image pixel may have a large number of grayscale levels (e.g., 10000 to 65000 grayscale levels), which provide a large dynamic range. Furthermore, the system may include a high power X-ray beam source (e.g., 1000 W) for better X-ray penetrating capability and better image quality. All these features (e.g., high resolution, large dynamic range, high power X-ray source) improve the system's capability for inspecting electronic parts or devices with high speed and high accuracy.

By using a limited number of X-ray images, particular embodiments of the system may inspect samples at a high speed and allow X-ray inspection to be performed in-situ and/or inline with the manufacturing processes in real-time. For applications that require screening hundreds or thousands of solder joints in a single integrated circuit package, particular embodiments of the system dramatically reduce the inspection time (e.g., from hours to a few seconds). For example, particular embodiments of the system may take a few seconds or less to perform the inspection while the traditional CT system may take many hours to create a large number of images needed for defect detection. Particular embodiments of the system may be capable of inspecting every electrical connection in a product with a throughput of 3000 mm² per minute. By sending feedback information to other manufacturing tools in real-time, particular embodiments of the system may allow the manufacturing process to adjusted in real-time when the defective samples are identified through X-ray inspection, and therefore significantly reduce the waste of producing a larger amount of defective parts. By sending feedforward information to subsequent manufacturing tools, the system may allow the subsequent tools to have a lower probability for producing defective parts. By quantitively evaluating healthiness level of compliant parts, particular embodiments of the system may allow the parts to be produced with a higher reliability and higher quality, and therefore significantly improve the product reliability and safety.

High-Speed, Inline, In-Situ and Real-Time X-Ray Inspection

High-Speed X-Ray Inspection

In particular embodiments, the automated high-speed X-ray inspection system may perform X-ray inspection on electronic parts or devices effectively based on a single X-ray image captured from a particular angle (e.g., a top down direction or a button-up direction) or several X-ray images captured from different angles (e.g., two or three X-ray images captured from different angles). The system may effectively identify defective parts and evaluate the quality of the inspected parts based on a limited number of X-ray images. For example, the system may determine material thickness of elements of interest (e.g., solder balls, solder contacts, solder connections, pins, joints, etc.) within an electronic package based on one or more X-ray images of the electronic package. The system may determine the material thickness based on variation of the X-ray absorption as represented by variation of image grayscale values. The system may use computer vision and computational analysis technologies to determine the material thickness distribution (e.g., profile or shape of associated elements of interest) and other features (e.g., edges, shapes, gradients, trends, grayscale values, etc.) of the inspected samples based on these X-ray image(s) to detect defective samples. In particular embodiments, the system may include one or more high-resolution X-ray detectors for generating high-resolution X-ray images. For example, the X-ray detectors may have a large number of pixels (e.g., 12+ megapixels, 29+ megapixels), a high sensitivity for X-ray radiation, and a large number of grayscale levels (e.g., 10,000+ grayscale levels) with a large dynamic range. In particular embodiments, the system may generate X-ray images with a frame rate of at least 30 FPS with an X-ray image being generated in a time period that is equal to or less than 33 milli seconds. In particular embodiments, the system may measure small scale features with a spatial resolution of lower than 0.5 microns. In particular embodiments, the X-ray images may be captured with a large field of view of at least 12 mm×12 mm. In particular embodiments, the samples may be inspected with a throughput no less than 3000 mm² per minute.

In particular embodiments, the system may use computer vision algorithms or/and machine-learning models to automatically analyze the captured X-ray images, identify defective samples, and classify defective samples into different categories. The computer vision algorithms and machine-learning models may analyze the X-ray images and provide metrology information in real-time at a speed that matches the speed for capturing X-ray images. As a result, the system may perform X-ray inspection many times faster (e.g., 100+ times faster) than traditional X-ray systems. In particular embodiments, the high-speed X-ray inspection capability may allow the system to be used for inline inspection of electronic parts during their manufacturing process. The system may capture X-ray images for the inspected samples, identify defective samples, evaluate quality levels of the compliant samples, and provide feedback or/and feedforward information to other tools used in the manufacturing process. In particular embodiments, the X-ray inspection may be performed in real-time during the manufacturing process of the inspected samples. In particular embodiments, the X-ray system may be integrated to the manufacturing tool (e.g., an assembling tool, a bonding tool, a placement tool, a thermo-compression bonding tool, a hybrid bonding tool, a drilling machine) to perform in-situ X-ray inspection, as will be discussed in later sections of this disclosure. In particular embodiment, the hybrid bonding tool may refer to any alternative bonding tools to the thermo-compression bonding tool and the hybrid bonding tools may combine metal interconnect with some other forms of bonding. In particular embodiments, the hybrid bonding tools may be associated with one or more chemical-mechanical polishing parameters.

Inline X-Ray Inspection

In particular embodiments, the automated high-speed X-ray inspection system may perform inline X-ray inspection on a subset or all of the samples during the manufacturing process of these samples. The term "inline inspection" or "inline measurement" may refer to inspection or measurement performed by the X-ray system within the same process (e.g., a drilling process, an assembling process, a bonding process, a manufacturing process, or any suitable processes) performed by another system (e.g., a drilling machine, a bonding tool, an assembling tool, or any suitable tools). As an example and not by way of limitation, during an assembling process performed by an assembling tool, the X-ray system may inspect the assembled parts, components or devices during one or more steps of the assembling process. The parts, components or devices may be automatically transferred from the assembling tool to the X-ray inspection system (e.g., by a robot arm, a conveyor belt) or may be manually transferred from the assembling tool to the X-ray inspection system (e.g., by a human operator). The X-ray inspection system may provide feedback information automatically to the assembling tool or to a human operator of the assembling tool. The system may inspect the component assemblies after they are assembled and before being put into the heating chamber. The system may inspect these component assemblies again after being bonded by a heating chamber. The system may identify the alignment changes before and after the bonding process. The system may measure the alignments and positions of a number of elements of interest within the inspected samples and send the measurement results to the assembling tool, the bonding tool, or their operators. In particular embodiments, the system may alert the operator for any potential issues that may affect the quality of manufactured products. The operators may adjust one or more parameters (e.g., temperature of heat chamber, intermediate time duration, position parameters, alignment parameters, etc.) to improve the manufacturing process for manufacturing products with higher quality. In particular embodiments, the system may automatically send feedback information to the assembling tool to cause the assembling tool to automatically adjust one or more functions or parameters to improve the manufacturing process with higher quality. In particular embodiments, the assembling tool may be a bonding tool, for example, a mass reflow device associated with a placement tool, a thermo-compression bonding tool, a hybrid bonding tool, etc.

Real-Time Inspection

In particular embodiments, the automated high-speed X-ray inspection system may perform real-time inspection or real-time measurement of electronic parts, components, or devices in one or more steps of their manufacturing process (e.g., a drilling process, an assembling process, a bonding process, etc.). In this disclosure, the term "real-time inspection" or "real-time measurement" may refer to inspection or measurement performed by the X-ray system in parallel or serially to an associated process (e.g., a drilling process, an assembling process, a bonding process, or any suitable processes) without slowing down the associated process. For example, during an assembling process, the system may perform inspections or measurements at a speed that is higher than or equal to an assembling tool assembling the electronic parts, components, or devices. This may be accomplished by a high-speed system that performs up to 100% inspection of each part, or by a sampled inspection of less than 100% of each part. In addition, the system may inspect a subset of the parts produced by one or more production tools. The system may capture X-ray images of the assembled parts, analyze the X-ray images using computer vision algorithms or/and machine-learning models, generate metrology information related to the inspected parts, and provide feedback information to the assembling tool in real-time during the assembling process.

In-Situ Inspection by Integrated X-Ray System

In particular embodiments, the automated high-speed X-ray inspection system may perform in situ inspection or measurement to one or more other systems or tools (e.g., a drilling machine, a bonding tool, an assembling tool, a placement tool, a mass reflow device, or any suitable tools) used in one or more steps of the manufacturing process. In particular embodiments, the term "in situ inspection" or "in situ measurement" may refer to inspection or measurement performed by the X-ray system that is local to other systems for performing other steps of the manufacturing process. In particular embodiments, the X-ray system may be integrated with other systems or tools (e.g., a drilling machine, a bonding tool, an assembling tool, a placement tool, a mass reflow device, or any suitable tools or equipment) used in the manufacturing process. For example, the X-ray system may be integrated into a drilling machine and perform in situ inspections or measurements to monitor the drilling process of the drilling machine. The in situ measurements may be automatically controlled by one or more computing systems coordinating the integrated X-ray inspection system and the drilling machine.

As another example, the X-ray system may be integrated into a bonding tool and perform in situ inspection or measurement to monitor the bonding process performed by the bonding tool. The in situ measurements may be automatically controlled by one or more computing systems coordinating the integrated X-ray system and the bonding tool. The system may continuously perform in situ inspection or measurement to the bonding tool and continuously feed the inspection or measurement results to the bonding tool to cause the bonding tool to adjust one or more functions or process parameters (e.g., temperatures, intermediate time duration, or any suitable process parameters). Once adjusted, the bonding tool may have a lower probability for producing defective parts or parts with deviating parameters from specification requirements. The manufactured products may have higher quality and lower defect rate and lower failure rate in field applications. In particular embodiments, the system may be integrated to bonding tools of any suitable types, for example, bonding tools for bonding assemblies with a heat chamber, bonding tools for bonding assemblies with pressure, bonding tools for metal-to-metal bonding, etc. In particular embodiments, the X-ray inspection system may identify a non-uniform temperature distribution in the heat chamber of the bonding tool and may feed that information to the heat chamber to adjust its operating parameters to have a uniform temperature distribution.

As another example, the system may be integrated to an assembling tool for assembling electronic parts. The assembling tool may include a placement tool and a mass reflow device. The system may continuously or periodically perform in situ inspection or measurement over time on the electronics parts (e.g., measuring mis-alignment or mis-placement) processed by the assembling tool. The system may track mis-alignment over time and identify an increasing trend in the measured mis-alignment. The system may send instructions to the assembling tool for adjusting related parameters based on the identified trends. The system may identify one or more drifting parameters (e.g., a drifting alignment, a drifting location, a drifting quality metric) before the assembling tool producing defective parts. The system may feed the measurement results or/and adjustment instructions to the assembling tool to cause the assembling tool to adjust one or more functions or process parameters (e.g., alignments, positions, placements, or any suitable parameters) to improve the assembling process. Once adjusted, the assembling tool may have a lower probability for producing defective or non-reliable parts. The electronic parts assembled by the assembling tool with the adjusted process parameters may have a higher quality, a lower defect rate, and a lower failure rate in field applications.

X-Ray Inspection and Metrology Information

Inspected Parameters and Defect Types

In particular embodiments, the automatic high-seed X-ray inspection system may be used inline or/and in situ in electronics manufacturing processes for inspecting the manufactured electronic parts or devices. The system may capture X-ray images of the inspected samples and generate metrology information related to these samples based on the captured X-ray images. In particular embodiments, the metrology information generated by the system may include, for example, but are not limited to, information about shapes of solder balls or solder contacts, information about one or more dimensions of a solder ball or a solder contact, information about one or more solder contact defects, information about alignment of an integrated circuit die to an interposer, information about a warpage defect, a uniformity metric of solder contacts, a solder contact external size, a joint diameter, a darkness metric of a contact pad area, a uniformity metric for a darkness coverage of a contact pad area, a continuous signal variation over a location of a contact pad, a bright signal ring where a ball and solder meet, a small dark and a uniform coverage over the contact pad area, deviations from parameters normally defining compliant solder joints, etc.

In particular embodiments, the automatic high-seed X-ray inspection system may be used to inspect electronic parts, components, devices, packages, or any suitable samples of interest. In particular embodiments, the X-ray inspection system may inspect a variety of samples of interest including, for example, but not limited to a high-density chip package, a 2.5D high-density chip package, a 3D high-density chip package, a package on package (PoP), a radio frequency (RF) package, a system-in-package (SIP) device, a fan-out wafer level package, etc. In particular embodiments, the X-ray inspection system may inspect samples of interest to detect solder contact defects including, for example, but not limited to a head-in-pillow defect, a snowman defect, a missing solder defect, a low solder volume defect, a high solder volume defect, a solder bridging defect, a partially-wet defect, a misalignment defect, a micro-bump defect, a cracked solder ball, a solder ball void, or a defective solder contact diameter. In particular embodiments, the solder defect may be identified based on a number of parameters measured by the X-ray inspection system including, for example, but not limited to a uniformity metric of the solder contact external size, a joint diameter, a darkness metric of a contact pad area, a uniformity metric for a darkness coverage of the contact pad area, a continuous signal variation over a location of a contact pad, a bright signal ring where a ball and solder meet, a small dark and uniform coverage over the contact pad area, deviations from parameters normally defining a good joint, etc. In particular embodiments, the automated high-speed X-ray inspection system may further detect one or more of a misaligned optical fiber, a misaligned optical connector, a warpage defect, a defective gap, a defective bond-line length, or a die warpage defect in a ball grid array (BGA).

In particular embodiments, the system may identify one or more defects associated with inspected samples based on the captured X-ray images. These defects may not be able to be detected by visible light-based inspections. For example, the system may inspect solder joints in flip chip or ball grid array packaging and these features may be obstructed by other components (e.g., components of other layers) and cannot be inspected by visible light-based inspection. In particular embodiments, the system may be capable of identifying a wide range of problems associated with the inspected electronic parts, components, packages, or devices including, for example, but not limited to, die chipping or cracking, standing or tombstoning components, component misplacements, component misalignments, missing components, solder wetting status (e.g., over-wet, non-wet), solder bridging (e.g., short), solder voids, oversized solder joints, undersized solder joints, missing balls, extra solder material, mis-located solder balls, surface-mounted component cracking, extra components, double components, rotated components, die tilting, non-wet copper connections, non-wet solders for surface-mounted components, insufficient solder for surface-mounted components, shorted surface-mounted connections, PCB via voids, embedded components, stack dies, die attachment coverages, etc.

In particular embodiments, the X-ray inspection system may examine the configuration of one or more elaborate structures such as multiple ICs or ICs and interposers stacked in a 2.5D or a 3D configuration, prior to completing the bonding of the configuration, to insure the components have been correctly aligned. In particular embodiments, the X-ray inspection system may be used as a component of a bonding system to not only examine and inspect, but to align and bond these multi-chip structures. For example, the X-ray inspection system may be used to align to objects before bonding or otherwise connecting them. In particular embodiments, the X-ray inspection system may be used in an alignment process between a chip and an interposer prior to bonding or attaching the individual components. The process of alignment and bonding may be adjusted to improve the accuracy and quality of these connections based on X-ray images generated by the X-ray inspection system. In particular embodiments, the X-ray inspection system may be used for real time feedback to alignment tools in aligning dice or interposers. In particular embodiments, the X-ray inspection system may be used to inspect the shape and dimensions of solder used to connect devices or interposers. These inspections may be used to control the manufacturing process or screen out defective material. The presence of some patterns of solder after bonding may be used to detect improper solder joints including joints in which the solder is not continuous between the two connection points and is therefore not a useful conductor of electricity or heat. In particular embodiments, multiple solder reflow processes may be utilized to repair or improve solder connections that are determined to be non-complying with manufacturing or product specifications based on inspection results of the X-ray inspection system.

Classify Defects Based on Feature Space a. Defect Detection Using Reference Models In particular embodiments, the system may use reference models or/and machine-learning models to identify defects in the inspected samples and classify the inspected samples into different categories. In particular embodiments, for an object of interest, the system may select one or more reference objects (e.g., preceding parts or surrounding parts of the same manufacturing line, the same inspection line, or the same production batch) and generate a reference model based on X-ray images of these reference objects. These reference objects may be the same type of objects to the object of interest and may have the same components with the object of interest. The system may compare the X-ray image of the object of interest to the reference model. The system may flag the difference between the X-ray image of the object of interest and the reference model. The system may use one or more defect models to determine whether the object of interest is associated with one or more defects, and if it is, classify these defects into respective defect categories. The defect models may be associated with a number of features (e.g., characterized by corresponding parameters with associated thresholds) for characterizing respective defect types. Since the X-ray images of the reference objects may have the same or similar background noise pattern to the X-ray image of the object of interest, the system may eliminate or minimize the influence of the background noise on identifying and classifying defects by comparing the X-ray image of the object of interest to the reference model. The system may identify and classify defects in the object of interest based on a single X-ray image captured from a particular angle or a limited number of X-ray images captured from different angles.

b. Classify Inspected Samples by ML Models

In particular embodiments, the system may use one or more machine-learning models to analyze the X-ray images and classify the inspected samples. The machine-learning models may be trained by historical data (e.g., features associated with labeled samples for supervised training, features associated with un-labeled samples for un-supervised training). The machine-learning models, once trained, may be used to inspect and classify new samples based on features extracted from X-ray images. The system may first extract a first set of features from X-ray images of the inspected samples. Then, the system may use a first machine-learning model, which is trained by un-labeled samples, to classify the inspected samples into inliers (i.e., compliant samples) and outliers (i.e., non-compliant samples) based on the first set of features. The inlier samples may be the samples that are statistically similar to the compliant samples. The outlier samples may be the samples that are statistically different from the compliant samples. In particular embodiments, the system may use the first machine-learning model to classify the inspected samples into inlier and outlier samples based on a comparison between a first set of features extracted from the X-ray images of the inspected samples and corresponding features of compliant samples. In particular embodiments, the system may classify the outlier samples into false positives or different defective types using a second machine-learning model. The second machine-learning model may be trained by labeled samples of different defect types to classify the outlier samples into a number of sub-categories (e.g., false positives, void defects, non-wet defects, non-contact open defects, head-in-pillow defects, bridging defects, misalignments, etc.) based on a second set of features determined based X-ray images of the inspected samples. The classification of false positives and different defective types may be based on a comparison of a second set of features extracted from the X-ray images of the inspected samples and the respective features of the positive false model and different defect models. In particular embodiments, the system may use one or more statistical analysis algorithms (instead of or in addition to the machine-learning models) to classify the inspected samples to inlier and outlier samples and classify the outlier samples into false positive samples and samples of different defect types. In particular embodiments, the second set of features may be different features from the first set of features. In particular embodiments, the second set of features may share some features with the first second of features.

In particular embodiments, by using two machine-learning models for inlier/outlier classification and sub-category classification, the system may allow each of the two models to be re-trained and updated without negatively affecting the accuracy and precision of the other model. For example, the system may periodically receive labeled samples of different defect types from a second X-ray tool (e.g., a CT x-ray system) and use the newly received labeled samples to re-train the second machine-learning model for classifying different defect types without affecting the first machine-learning model for classifying inlier/outlier samples. As another example, the first machine-learning model for classifying inlier/outlier samples may be re-trained by new samples (e.g., unlabeled samples) without affecting the second machine-learning model. In particular embodiments, the system may use a computer vision algorithm to extract the features of the inspected samples from X-ray images and feed the extracted features into the machine-learning models, which are trained based on features of corresponding training samples. In particular embodiments, the system may use a separate machine-learning for extract the features of the inspected samples from X-ray images and feed the extracted features to another machine-learning model for identifying and classifying samples. In particular embodiments, the system may directly feed the X-ray images of the inspected sample to the same machine-learning models which may extract the features of the inspected samples from the X-ray image, identify, and classify defects associated with the inspected samples.

In particular embodiments, the features of the first set of features or/and the second set of features extracted by the system may include, for example, but are not limited to, one or more component dimensions (e.g., diameter, length, width, height, thickness), component areas, material distributions, profile gradients, positions, distances to other components, relative positions or stacking orders to other components, one or more variations cross multiple X-images generated at different directions (e.g., diameter variations, length variations, width variations, height variations, area variations, shape variations, position variations, displacements, alignment variations), one or more characteristics (e.g., relative amplitude differences, changing trends), rates of change of grayscales in X-ray images, curvatures of curved lines, gradients of one or more edges, one or more characteristics of surrounding areas, etc. In particular embodiments, the first set of features and the second set of features may each include a combination of one or more features as described above. In particular embodiments, the second set of features may be different or partially different from the first set of features. In particular embodiments, the second set of features may be the same as the first set of features.

c. Example for Classifying Inspected Samples in Feature Space

Figure 2A:
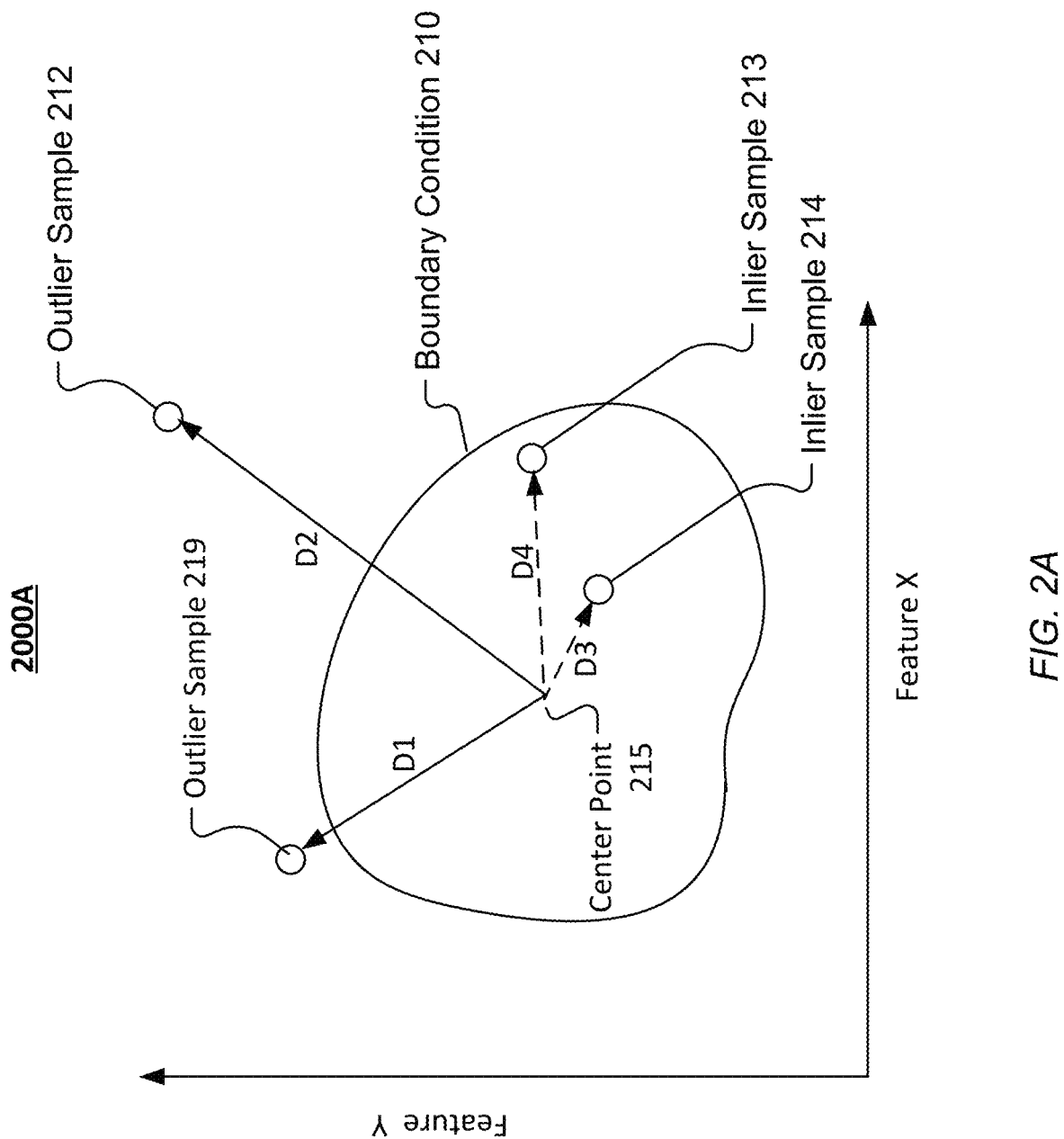
FIG. 2A illustrates an example process for classifying inspected samples into inlier samples and outlier samples based on a first set of features.

FIG. 2A illustrates an example process 2000A for classifying inspected samples into inlier samples and outlier samples based on a first set of features. In particular embodiments, the system may determine an N-dimensional feature space based on the first set of N features. The system may determine the boundary condition 210 of inlier samples in the N-dimensional feature space based on one or more criteria that characterize the inlier samples. For example, the inlier samples may be characterized based on corresponding locations in the feature space and corresponding distances to a reference point (e.g., the center point 215) or/and the boundary condition 210. For inspecting new samples, the system may extract the corresponding features from the X-ray images of the inspected samples, compare those extracted features to corresponding features of the inlier samples, and classify the inspected samples into inlier samples and outlier samples. As an example and not by way of limitation, the boundary condition 210 may be characterized in the feature space by two features (e.g., feature X and feature Y). The system may determine the locations of the inspected samples in the feature space and the distances of the inspected samples to the boundary condition 210 and classify the inspected samples. For example, the system may determine the inspected samples 219 and 212 are outlier samples because they are outside the boundary condition 210 in this feature space. As another example, the system may determine that the inspected sample 213 and 214 are inlier samples because they are within the boundary condition 210. It is notable that the two dimensional feature space as shown in FIG. 2A is for example purposes only, and the feature space is not limited thereto. For example, the feature space may be a N-dimension space defined on N features of the first set of features. It is notable that the boundary condition as shown in FIG. 2A is for example purpose only, and the boundary condition is not limited thereto. For example, a boundary criterion may be based on a single feature or a combination of any number of features of the inspected samples.

Figure 2B:
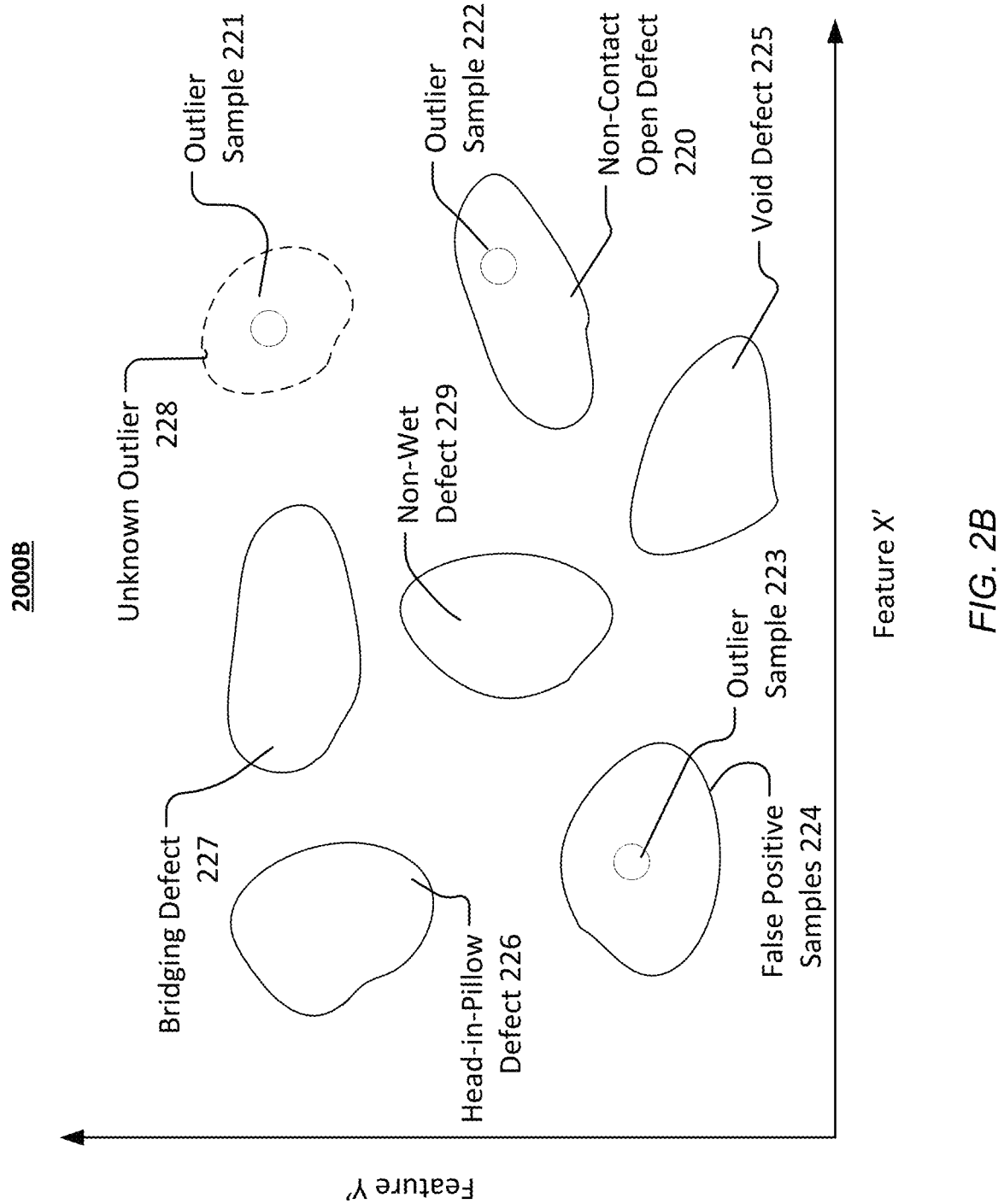
FIG. 2B illustrates an example scheme for classifying inspected samples into different sub-categories based on a second set of features.

FIG. 2B illustrates an example scheme 2000B for classifying inspected samples into different sub-categories based on a second set of features. In particular embodiments, the system may generate a number of outlier sample models in a feature space based on a second set of features including M features. The outlier sample models may be characterized in the feature space (e.g., a M-dimension space based on M features of the second set of features) using one or more criteria that characterize the similarity of the outlier samples. In particular embodiments, the second set of features may be a different set of features from the first set of features. During the inspection process, the system may extract the corresponding features from the X-ray images of the inspected samples, compare those extracted features to the outlier sample models in the feature space, and classify the outlier samples into different sub-categories. As an example and not by way of limitation, as shown in FIG. 2B, the system may generate a number of outlier sample models in the feature space. The outlier models may include, for example, but are not limited to, a false positive model 224, a void defect model 225, a non-contact open defect model 220, a non-wet defect model 229, a head-in-pillow defect model 226, a bridging defect model 227, a model for unknow outlier samples 228, etc. The system may determine the corresponding locations of the outlier samples in the feature space and classify the outlier samples into different categories. For example, the outlier sample 221 may be classified as an unknown outlier since it is an outlier sample but does not fall into any sub-categories in the feature space of the second set of features. As another example, the outlier sample 222 may be classified as non-contact open defect since it falls in the boundary of the non-contact open defect 220. As yet another example, the outlier sample 223 may be classified into the false positive category because it falls in the boundary of the false positive category 224. It is notable that the outlier sample models as shown in FIG. 2B are for example purposes only, and the models are not limited thereto. For example, the models may be based on a feature space described by any number of features of the second set of features.

In particular embodiments, the first or/and second set of features of the inspected samples may be extracted from corresponding X-ray images using, for example, but not limited to, a computer vision algorithm (e.g., based on reference models generated from adjacent samples), a computer algorithm for statistic analysis, a machine-learning model, or any suitable algorithms. In particular embodiments, the inspected samples may be classified using, for example, but not limited to, a computer vision algorithm, a machine-learning model, a computer algorithm for statistical analysis, etc. In particular embodiments, the inlier/outlier sample models may be machine-learning models with associated weights or feature-based sample models (e.g., vectors associated a number of features, sample parameters, and thresholds). In particular embodiments, the system may generate new models for the outlier samples with unknown defects based on the new knowledge learned by the computer algorithms, machine-learning models, or/and inputs from human operators. In particular embodiments, the newly classified samples may be used to update existing sample models or/and train machine-learning models to improve the classification accuracy and precision over time.

Quality Metric Based on Feature Space

In particular embodiments, the system may use a quality metric (e.g., a quality score) to indicate the quantified quality level or healthiness level of the inspected samples. For example, the system may determine a quality score for each inspected sample based on a corresponding location of that sample in the feature space and a distance to a reference point (e.g., a center point or an average point of inlier samples) of the feature space. The system may determine whether a sample is a compliant sample or non-compliant samples by comparing that quality score to corresponding thresholds. For the compliant samples, the system may use the quality score to indicate the quantified quality levels of these samples. The compliant samples having higher quality scores may have a higher quality level than some other compliant samples (e.g., being closer in the feature space to a reference point or an average point) having lower quality scores. As an example and not by way of limitation, as shown in FIG. 2A, the system may determine distance values of D1, D2, D3, and D4 for the inspected samples 219, 212, 212, and 214, respectively, with respect to the center point 215 of the inlier samples. The system may determine that, although the samples 213 and 214 are both compliant samples, the sample 213 has a smaller distance D3 to the average center point 215 than the sample 214 (which has distance D4). The system may determine that the sample 213 may have a higher quality score than the sample 214. The system may determine that the sample 214 may have a relatively lower reliability in long term although it may be fully functional at the time of this inspection based on a determination that the sample 214 is near the boundary condition 210 (e.g., within a threshold distance).

In particular embodiments, the system may predict, for each inspected sample, an estimated life time based on the quality metric and predict a possible failure mode based on a corresponding location of that sample in the feature space. For example, as shown in FIG. 2A, the system may determine the estimated life time based on the length of the distance vectors (e.g., D1, D2, D3, and D4) and determine the possible failure mode based on the direction of the distance vectors (e.g., D1, D2, D3, and D4). Similarly, the system may determine that, although the samples 219 and 212 are both outlier samples, the sample 212 has a larger distance to the average center point 215 than the sample 219. The system may determine that the manufacturing process of the sample 212 may have a greater parameter deviation from specification requirements.

Determining Root Causes in Manufacture Process

Detect Early Problems by Identifying Drifts

In particular embodiments, the system may detect problems of the manufacturing process in early stages by identifying one or more drifts in one or more sample parameters of the inspected samples. In particular embodiments, the system may track the variations of the measured parameters over time or/and over a series of samples, and identify drifts based on the tracked parameter variations. In particular embodiments, the system may identify drifts based on variations in, for example, but not limited to, the shapes of solder joints at individual solder joint level, diameters, Z-axis thickness, sizes of the solder joints, etc. As an example and not by way of limitation, the system may identify an alignment drift in the inspected samples. The system may determine that the alignment drift in the inspected samples is caused by a shifting parameter of the bonding tool used in the bonding process. The system may predict that shifting parameter of the bonding tool, if is not corrected, may result in producing defective parts. The system may identify this problem before the bonding tool actually cause any defective parts to be produced and send this information to the bonding tool to adjust the shifting parameter of the bonding tool. As another example, the system may identify a size drift in the solder joint of the inspected samples. The system may determine that the size drift in the inspected samples is caused by a shifting parameter of the assembling tool used in the assembling process. The system may predict that the shifting parameter of the assembling tool, if not corrected, may result in producing defective parts. The system may identify this problem before the assembling tool actually causes any defective parts to be produced and send this information to the assembling tool to adjust the shifting parameter.

Determine Root Causes Associated with Interactions of Multiple Parameters

In particular embodiments, the problems (e.g., misalignment defects) in the produced parts may be caused by interactions of multiple parameters that deviates from specification requirements in the manufacturing process. There may be no obvious correlations between the identified defects and the parameters of the manufacturing tool that cause the defects. Traditional inspection technologies may not able to determine which variables have caused the defects. In particular embodiments, the system may use machine-learning models, which are trained by historical data, to identify the root causes of the defects of the inspected samples that are identified based on the X-ray inspection. The system may use a sample population manufactured or processed under certain process conditions to train the machine-learning models. During the training process, the machine-learning models may adjust its weights to characterize the boundary conditions of compliant samples as defined by the training sample population. The machine-learning model, once trained, may be highly sensitive to the parameters in the inspected samples and variable changes in the manufacturing process. During the inspection process, the system may use the trained machine-learning models to identify the parameter changes and drifts of the manufacturing tool in the manufacturing process. When the machine-learning models identify one or more parameters in the inspected samples that are beyond the boundary of the compliant samples (e.g., outside pre-determined threshold ranges) or identify one or more defects in the inspected samples, the machine-learning models may determine the corresponding root cause parameters related to the manufacturing tool and the manufacturing process. Then, the system may send instructions to the manufacture tool to pause the manufacturing process and adjust the corresponding parameters of the manufacture tool. In particular embodiments, the system may send the instructions or data to the manufacture tool to automatically adjust the corresponding parameters of the manufacture tool without pausing the manufacturing process.

Feedback and Feedforward for Process Control

Feedback to Prior Process for Adjusting Functions and Parameters

Figure 3:
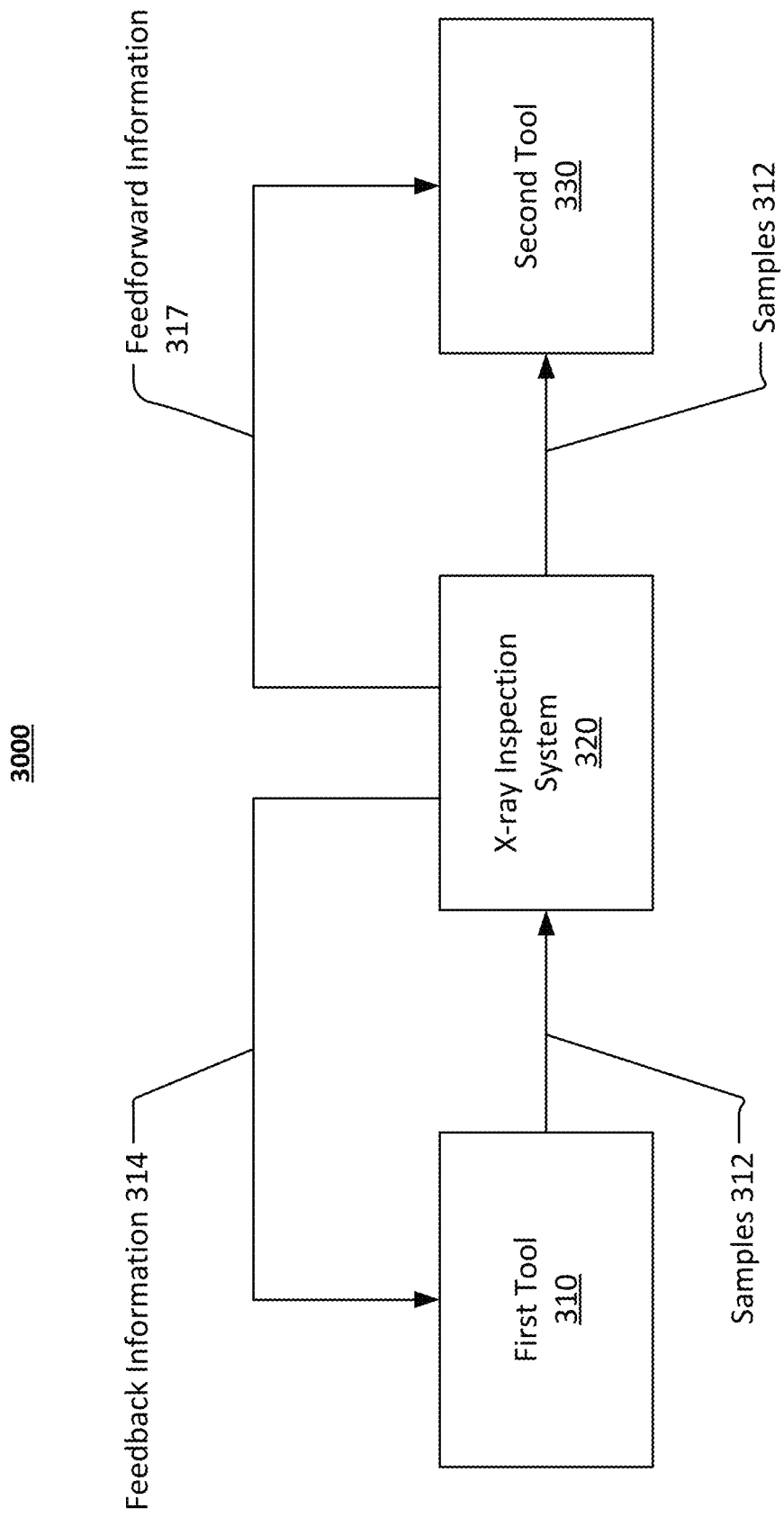
FIG. 3 illustrates an example framework for adjusting manufacturing process parameters based on feedback and feedforward information from X-ray inspection.

FIG. 3 illustrates an example framework 3000 for adjusting manufacturing process parameters based on feedback and feedforward information from X-ray inspection. In particular embodiments, a first tool 311 may be used to process electronic parts or devices during the manufacturing process of these electronic parts or devices. In particular embodiments, the first tool 311 may be, for example, but is not limited to, an assembling tool, a bonding tool, a placement tool, a drilling machine, a thermo-compression bonding tool, a hybrid bonding tool, etc. The first tool 311 may be used to process the produced samples 312 in one or more steps of the manufacturing process. In particular embodiments, the X-ray inspection system 320 may inspect the samples 312 that are processed by the first tool 311. The X-ray inspection system 320 may be inline or/and in situ with the first tool 310 for processing the samples 312. The system 320 may capture X-ray images of the samples 312, use computer vision algorithms or/and machine-learning models to analyze the captured X-ray images, and generate metrology information about the inspected samples 312. When the system 320 detects one or more defects in the inspected samples 312 or determines that one or more sample parameters of the inspected samples 312 have deviated from specification (e.g., being outside pre-determined threshold ranges), the system 320 may send feedback information 314 to the first tool 311 to adjust one or more process parameters associated with the first tool 311 and the manufacturing process based on the metrology information. In particular embodiments, the system 320 may perform the X-ray inspection and send the feedback information 314 to the first tool 311 in real-time while the samples 312 are processed by the first tool 311. The first tool 311, after received the feedback information 314, may adjust one or more process parameters associated with the manufacturing process. New samples processed by the first tool 311, after being adjusted, may have a lower probability for producing defective parts or parts with parameters being outside the pre-determined ranges as defined by specification requirements.

In particular embodiments, the X-ray inspection system 320 may cause the first tool 311 to use the inspection and measurement results to adjust process parameters directly without stopping the first tool 311 for processing samples. In particular embodiments, the X-ray inspection system 320 may cause the first tool 311 to stop the production process and make necessary changes in one or more process parameters to restore the process to the desired quality level. In particular embodiments, the X-ray inspection system 320 may perform in situ measurement to the first tool 311 and provide in situ feedback to the first tool to adjust one or more parameters related to the manufacturing process. In particular embodiments, the X-ray inspection system 320 may perform inline inspection or measurement in the manufacturing process and provide feedback information to the first tool 320 or an operator of the first tool 320 to adjust parameters of the manufacturing process. By using this in situ or/and inline inspection and feedback, particular embodiments of the system may cause the manufacturing process to adjust one or more process parameters that affect the quality of the manufactured products, and therefore reduce the quantity of defective parts during the manufacturing process. In particular embodiments, the system may control the quality of production parts in a more narrowly defined specification range, and therefore reduce the defective rate of the manufactured products to, for example, 1 part per billion.

Feedforward to Subsequent Process for Adjusting Functions and Parameters

In particular embodiments, the X-ray inspection system 320 may provide feedforward information 317 to a second tool 330 that will process these samples in one or more subsequent steps of the manufacturing process. In particular embodiments, the second tool 330 may be, for example, but is not limited to, an assembling tool, a bonding tool, a placement tool, a drilling machine, a thermo-compression bonding tool, a hybrid bonding tool, etc. In particular embodiments, the X-ray inspection system 320 may inspect the samples 312, which will be processed by the second tool 330 in one or more subsequent steps of the manufacturing process. The one or more subsequent steps of the manufacturing process may be inline or/and in situ with the second tool 320 for processing the samples 312. The X-ray inspection system 320 may capture X-ray images of the samples 312, use computer vision algorithms or/and machine-learning models to analyze the captured X-ray images, and generate metrology information about the inspected samples 312. When the X-ray inspection system 320 detects one or more defects in the inspected samples 312 or determines that one or more parameters of the inspected samples 312 have deviated from specification for a threshold difference (e.g., being outside pre-determine ranges), the X-ray inspection system 320 may send feedforward information 317 to the second tool 330 to adjust one or more parameters associated with the second tool 330 of the manufacturing process based on the metrology information. In particular embodiments, the X-ray inspection system 320 may perform the X-ray inspection and send the feedforward information 317 to the second tool 330 in real-time while the samples 312 are processed by the second tool 330 in a subsequent step of the manufacturing process. The second tool 330, after received the feedforward information 317, may adjust one or more process parameters associated with the manufacturing process and process the samples 312. In particular embodiments, the samples 312, after being processed by the second tool 330 with the adjusted parameters, may have the identified defects be eliminated or corrected and have their parameters meet respective specification requirements (e.g., being with respective pre-determine ranges). In particular embodiments, the second tool 330 after having its parameter being adjusted, may process subsequent samples in a subsequent step of the manufacturing process and may have a lower probability for producing defective parts or parts with deviating parameters from the specification requirements. In particular embodiments, the X-ray inspection system may include one or more compute processors, either within an X-ray machine or remote to an X-ray machine, that process the feedback/feedforward information that is provided to these tools. In particular embodiments, the provided feedback/feedforward information may be communicated using any communication methods including, for example, but not limited to, over a local area network (e.g., a wired network or wireless network), over a telecommunication network, through an intermediary computer, etc.

Excluding Subsequent Processes

In particular embodiments, the X-ray inspection system may send feedforward information to one or more tools that will be used in one or more subsequent steps of the manufacturing process to modify one or more steps of the manufacturing process. As an example and not by way of limitation, the system may determine that one or more subsequent steps of the manufacturing process are redundant based on the metrology information generated based on the X-ray images of the inspected samples. The system may send instructions to the one or more tools used on the subsequent steps to exclude the redundant subsequent steps from the manufacturing process. As another example, the system may determine that, based on the metrology information of the inspected samples, one or more extra subsequent steps (e.g., re-process the samples to eliminate defects or correct structural problems) are needed in the manufacturing process. The system may send instructions to one or more tools used in the downstream steps to include one or more extra steps in the manufacturing process.

Feedback Loop Example: Adjust Bonding Process Parameters a. Bonding Process Parameters In particular embodiments, the system may use a machine-learning model to classify the inspected samples into different sample categories. Each sample category may correspond to a manufacturing process with particular process parameters (e.g., intermediate time duration before putting the samples into a heating chamber and temperature within the heating chamber during the bonding process). In particular embodiments, the inspected samples may be electronic components or devices manufactured or assembled using a bonding tool. The electronic components or devices may be put into a heating chamber for bonding after being assembled and aligned. The assembled electronic products may be put on different lots of the chamber and may have requirements on the temperature range during the bonding process and on the intermediate time duration after being assembled and before being put into the chamber. For example, the electronic products may require the chamber temperature to be within the range of 400±50 degrees during the bonding process for qualified bonding results. As another example, the electronic products may require to be put into the chamber within 1 hour after assembled. The electronic products may be bonded with qualified results when the temperature and intermediate time duration before being put into the chamber meet these requirements. However, the variation of the temperature and intermediate time duration may cause product quality variation of the products (even when the variation of the temperature and intermediate time duration are within the required ranges and the products pass the electrical test). In particular embodiments, the system may use a machine-learning model to evaluate the quality of inspected samples and provide information for adjusting one or more parameters of the manufacturing process.

b. Parameter Space for Bonding Process

Figure 4:
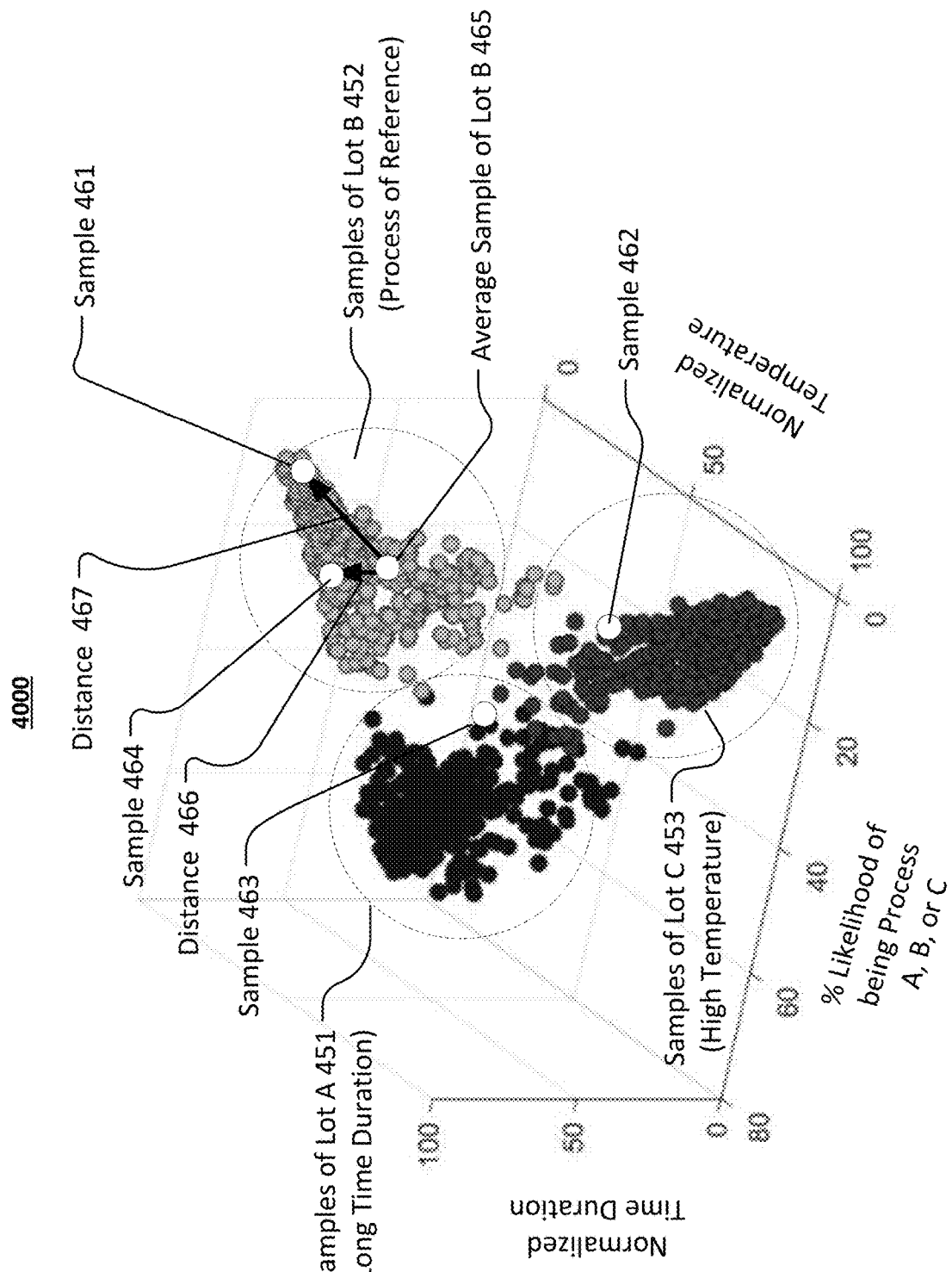
FIG. 4 illustrates an example process for classifying inspected samples into different sample categories corresponding to different manufacturing process parameters.

FIG. 4 illustrates an example process 4000 for classifying inspected samples into different sample categories corresponding to different manufacturing process parameters. In particular embodiments, the machine-learning model may be trained by training samples of a number of sample categories each corresponding to a different set of parameter values for the manufacturing process. The process parameters may be used for classifying newly inspected samples into corresponding sample categories. As an example and not by way of limitation, the machine-learning model may be fed with a number of X-ray images of a number of training samples with known manufacturing process parameters. For example, the samples of Lot A 451 may include samples that are put into the chamber after more than 1 hour (e.g., 2 hours) after being assembled and have a standard chamber temperature of 450 degrees during the bonding process. The samples of Lot B 452 may include samples that are manufactured with parameters of a process of reference (POR) with a temperature of 400 degrees during the bonding process and an intermediate time duration of 1 hour before the samples are put into chamber. The samples of Lot C 453 may include samples that have higher chamber temperature (e.g., a highest limit of the required temperature range 450 degrees) during the bonding process and standard intermediate time duration of 1 hour. The manufacturing process parameters of these samples (e.g., Lot A, Lot B, and Lot C) may be known and labeled for the corresponding X-ray images.

In particular embodiments, the system may extract a set of features for one or more elements of interest from the X-ray images (e.g., using machine-learning models or computer vision algorithms). In particular embodiments, the features may include, for example, but are not limited to, one or more component dimensions (e.g., diameter, length, width, height, thickness), component areas, material distributions, profile gradients, positions, distances to other components, relative positions or stacking orders to other components, one or more variations (e.g., diameter variations, length variations, width variations, height variations, area variations, shape variations, position variations, displacements, alignment variations) cross multiple X-images generated from different directions, one or more characteristics (e.g., relative amplitude differences, changing trends), rates of change of grayscales in X-ray images, curvatures of curved lines, sharpness of one or more edges, one or more characteristics of surrounding areas, etc. The extracted features may be fed to the machine-learning models during a training process. One trained, the system may use the machine-learning models to classify inspected samples into different sample categories with each category corresponding to a sample lot (which corresponds to a particular combination of manufacturing process parameters).

In particular embodiments, the machine-learning model may determine the similarity of the samples within a sample category based on one or more features of a set of features. The system may cluster these samples into corresponding sample category in the feature space as described by the set of features. The samples of a sample category may be described by a boundary criterion related to one or more features in the feature space. The boundary criteria may include a threshold (e.g., 60%) for a likelihood percentage of a sample belonging to a corresponding category. The machine-learning model may determine a percentage value for each sample to indicate the likelihood of that sample belonging to each category. For example, a sample may have a 60% likelihood of belonging to Lot A and 20% likelihood for Lot B and C. As another example, a sample may have a 33% likelihood for belonging to Lot A, Lot B, and Lot C, respectively, which may indicate that the sample could be an outlier sample since it is not similar to any known samples of any known categories. The boundary criteria of these sample categories may be used to determine the similarity of unknow samples to the known samples in the sample categories for classifying these unknow samples.

In particular embodiments, once trained, the machine-learning model may be fed with X-ray images of newly inspected samples (e.g., samples 461, 462, 463, and 464) for classification. The machine-learning model may extract a set of features from the X-ray images of the newly inspected samples (e.g., samples 461, 462, 463, and 464) and compare these features to the features of the known samples in each category to classify these newly inspected samples. For example, the machine-learning model may compare the features of the samples 461 and 464 to the features of the samples of the three lots and determine the corresponding likelihood percentage values of the samples 461 and 464 for each category. When the samples 461 and 464 meet the boundary criterion of Lot B (e.g., likelihood percentage values being above the corresponding threshold), the machine-learning model may classify the samples 461 and 464 into the sample category of Lot B 452. As another example, the machine-learning model may compare the features of the samples 462 and 463 to the features of the samples of Lot C 453 and Lot A 451, respectively and determine the respective likelihood percentage values. The machine-learning model may determine that the samples 462 and 463 meet the boundary criteria (e.g., respective likelihood percentage above corresponding thresholds) of the sample categories Lot C and Lot A, respectively. The machine-learning model may classify the samples 462 and 463 into the sample category of Lot C 452 and Lot A 451, respectively.

In particular embodiments, the machine-learning model may determine a probability of failure for an inspected sample based on the manufacturing process associated with the corresponding sample category. For example, for the samples 461 and 464 classified into the sample category of Lot B 452, the system may determine that the manufacturing process of the samples 461 and 464 may have the same or similar parameters to the process of reference (e.g., a temperature of 400 degrees during the bonding process and an intermediate time duration of 1 hour before being put into chamber). The machine-learning model may determine a probability of failure for the samples 464 and 461 based on the failure rate or defect rate of the samples manufactured by the process of reference (e.g., 1 part per million). As another example, the system may determine that the manufacturing process of the samples 462 and 463 may have the same or similar parameters to the manufacturing processes associated with Lot C and Lot B. The machine-learning model may determine a probability of failure for the samples 462 and 463 based on the failure rates or defect rates of the samples of Lot C and Lot B (e.g., 100 parts per million). Since all the samples (or similar samples) of Lot A, Lot B, and Lot C may pass the electrical test and be fully functional, all these samples may be included in the end products. Particular embodiments of the system may predict the likelihood of failure, the life span, and the possible failure modes for these samples included in the end products.

In particular embodiments, the system may determine one or more quantified quality metrics for the inspected samples based on their degree of similarity or dissimilarity to the samples of different categories. For example, even though the samples 461 and 464 manufactured by the process of reference both have a failure rate of 1 PPM, the sample 461 may have a slightly higher failure rate (and therefore lower quality) than the sample 464 because the sample 461 has a far distance to the average point of the Lot B 452. The system may determine the distances of the inspected samples (e.g., distance 466 and 467) to a reference point (e.g., the average point of the samples of the lot) and determine a quantified quality metric for each inspected sample. The quantified quality metric may indicate the quality of the inspected samples as determined by the degree of similarity to the average sample of a sample category. In particular embodiments, the system may identify an inspected sample as an outlier sample when then quantified quality metric meet an outlier criterion. For example, when the system identifies that an inspected sample has a large distance (e.g., larger than a distance threshold) to all known samples and does not fall into any known sample categories, the system may identify that sample as an outlier sample.

In particular embodiments, the system may determine the parameters of the manufacturing process of the inspected samples based on the sample classification results. For example, the system may identify that the inspected sample 464 is manufactured by a process of reference based on a determination that the inspected sample is classified into the sample category of Lot B 452. As another example, the system may identify that the inspected sample 463 is manufactured by a process with longer intermediate time duration based on a determination that the inspected sample is classified into the sample category of Lot A 451. As yet another example, the system may identify that the inspected sample 462 is manufactured by a process with higher chamber temperature based on a determination that the inspected sample is classified into the sample category of Lot C 453. The system may identify the manufacturing processes for the sample 462 and 463 as problematic (even though their process parameters are within the requirement ranges) because they have higher defect rates and failure rates. The system may provide these measurement results as closed-loop feedback information to the manufacturing process and cause one or more process parameters (e.g., intermediate time duration, chamber temperature) to be adjusted so that the any future products may have higher quality with lower defect rate and lower failure rate.

c. Inspection Based on a Sub-Set of Samples

In particular embodiments, the system may determine one or more parameters or metrics related to the manufacturing process by inspecting a limited number of samples, and then infer the quality of the other samples that are manufactured during the same process with the same manufacturing process parameters. In particular embodiments, the system may inspect a limited number of samples to determine the manufacturing process parameters for a large number of samples that are manufactured during the same manufacturing process. For example, for a group of samples that are produced together (e.g., in the same slot during the same assembling or/and bonding processes), the system may inspect at least one sample of this group of samples and classify the inspected sample into a sample category with known manufacturing process parameters. Then, the system may determine a predicted failure rate or defective rate of the group of samples based on previously manufactured products using the same manufacturing process parameters (without inspecting all samples of this group). For the at least one inspected sample, the system may inspect a number of elements of interest (e.g., pins or solder connections) that allow the corresponding set of features to be extracted. The inspected sample may be classified based on the extracted features. In particular embodiments, the system may inspect a portion (e.g., a corner portion) of the at least one inspected sample to extract the corresponding features needed for classifying the inspected samples. In particular embodiments, the number of inspected samples that are needed to classify a group of samples that are manufactured during the same manufacturing process may be determined by the machine-learning model during the inference processes. In particular embodiments, the number of elements of interest (e.g., pins, solder connections) that are needed to extract the necessary features to classify the inspected sample may be determined by the machine-learning model during the inference processes.

d. Adjust Parameters of Bonding Tool

In particular embodiments, the system may cause manufacturing process parameters to be adjusted based on inline, in situ, and real-time X-ray inspection. The system may use a machine-learning model to extract one or more features associated with an inspected sample from one or more X-ray images of that inspected sample. The system may use the machine-learning model to classify the inspected sample into a sample category of a number of sample categories based on the extracted one or more features. Each sample category may correspond to a manufacturing process with a number of process parameters (e.g., a time duration before putting the inspected sample into a heating chamber and a temperature of the heating chamber during the manufacturing process). The machine-learning model may be trained based on previously inspected samples of each sample category. The system may use the machine-learning model to determine a quantified similarity metric between the inspected sample and a number of previously inspected samples of the sample category. The system may use the machine-learning model to predict a probability of failure for the inspected sample based on the quantified similarity metric. The probability of failure may be determined based on a defective rate or a failure rate associated with the sample category. In particular embodiments, the system may determine a defective rate or failure rate for a number of samples that are not inspected. These uninspected samples may be manufactured using the same manufacturing process with the same process parameters to the inspected sample.

In particular embodiments, the system may send feedback information to the bonding tool and cause the bonding tool to adjust one or more process parameters (e.g., a time duration before putting the inspected sample into a heating chamber and a temperature of the heating chamber during the manufacturing process). In particular embodiments, the feedback (or feedforward) information sent to another tool of the manufacturing process may include, for example, but is not limited to, instructions to adjust particular parameters, identified defects in the inspected samples, metrology information determined based on X-ray images, one or more features of inspected samples, drifts or trends of one or more sample parameters. For example, the system may send the in situ measurement results to a bonding tool to cause the bonding tool to adjust the time duration before putting the inspected sample into the heating chamber and the temperature of the heating chamber during the manufacturing process. In particular embodiments, the system may send inline measurement results to an operator of a bonding tool to cause the bonding tool to adjust one or more parameters of the process parameters by the operator. In particular embodiments, the system may cause the manufacturing process to be stopped and cause the bonding tool to adjust its parameters automatically. In particular embodiments, the system may send instructions to the bonding tool to cause the bonding to adjust one or more process parameter without stopping the bonding tool from process subsequent samples.

Example Method

FIG. 5 illustrates an example method 5000 for providing feedback information to a tool based on X-ray inspection results of samples processed by that tool. The method may begin at step 510, where an X-ray inspection system may capture one or more X-ray images for one or more samples of interest that have been processed by a first tool. The X-ray inspection system may be inline with the first tool. The X-ray inspection system may have an inspection speed of 300 mm$^2$ per minute or greater. At step 520, the system may determine, in real-time, metrology information related to the one or more samples of interest based on the one or more X-ray images. The metrology information may indicate that a sample parameter associated with the one or more samples of interest is outside of a pre-determined threshold range associated with the sample parameter. At step 530, the system may provide, responsive to the real-time determination that the sample parameter is outside of the pre-determined threshold range, instructions to one or more of the first tool or/and one or more second tools to adjust one or more process parameters associated with the respective tools based on the metrology information related to the one or more samples of interest. The adjusted process parameters may reduce a processing error probability, of the respective tool for processing subsequent samples, related to the sample parameter being outside of the pre-determined range.

In particular embodiments, the X-ray inspection system may have an inspection speed of 1000 mm$^2$ per minute or greater. In particular embodiments, the X-ray inspection system may have an inspection speed of 3000 mm$^2$ per minute or greater. In particular embodiments, the one or more X-ray images may be captured with a field of view of 12 million pixels or greater. In particular embodiments, the metrology information determined based on the one or more X-ray images may include measurement information associated with one or more structural features measured with a spatial resolution of 0.5 microns. In particular embodiments, the X-ray inspection system may inspect the one or more samples of interest at a first speed faster than or equal to a second speed for the first tool or the one or more second tools to process the one or more samples of interest. In particular embodiments, the system may determine that the one or more samples of interest have one or more defects based on the metrology information. The instructions provided to the first tool may be generated based on the one or more defects of the one or more samples of interest. In particular embodiments, the one or more second tools may be associated with one or more subsequent processes for processing or re-processing the one or more samples of interest and the subsequent samples.

In particular embodiments, the system may determine that one or more subsequent steps for processing the one or more samples of interest are redundant based on the metrology information related to the one or more samples of interest. The system may send instructions to the one or more second tools to exclude the one or more subsequent processes from a manufacturing process associated with the one or more samples of interest. In particular embodiments, the one or more samples of interest may be inspected in real-time during a same process in which the one or more samples of interest are processed by the first tool. In particular embodiments, the one or more samples of interest may be inspected in situ to the first tool for processing the one or more samples of interest and the X-ray inspection system may be integrated with the first tool. In particular embodiments, the metrology information determined based on the one or more X-ray images comprises one or more of: shape information of solder balls, dimensional information of solder balls, defect information, alignment information of an integrated circuit die to an interposer, warpage information, a uniformity metric associated with a solder contact external size, a solder joint diameter, a darkness metric of a contact pad area, a uniformity metric for a darkness coverage of a contact pad area, a continuous signal variation over a location of a contact pad, a bright signal ring connecting a ball and solder, a small dark and uniform overage over the contact pad area, parameter deviations from a product specification, a tilt angle of a die with respect to an interposer, a tilt angle of a die with respect to a substrate (e.g., an organic substrate), etc. In particular embodiments, the metrology information may be generated by a computer vision algorithm or a machine-learning model trained by historical data.

In particular embodiments, the first tool may be an assembling tool for assembling the samples of interest and the subsequent samples. In particular embodiments, the assembling tool may be a bonding tool including a placement tool and a mass reflow device. In particular embodiments, the assembling tool may be a thermo-compression bonding tool or a hybrid bonding tool. In particular embodiments, the one or more process parameters of the first tool being adjusted may include one or more of, for example, but are not limited to, a chemical-mechanical polishing parameter, an alignment of an integrated circuit die, an alignment of an interposer, a bonding force, a bonding temperature, a rate of heating, a rate of cooling, or a time duration after being assembled and before being heated. In particular embodiments, the one or more samples of interest may be re-processed by the first tool to make one or more adjustments to the one or more samples of interest. The one or more adjustments to the one or more samples of interest may be made based on the metrology information of the one or more samples of interest. In particular embodiment, the one or more samples inspected by the X-ray inspection system may be of a subset of a sample population processed by the first tool.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing feedback information to a tool based on X-ray inspection results of samples processed by that tool including the particular steps of the method of FIG. 5, this disclosure contemplates any suitable method for providing feedback information to a tool based on X-ray inspection results of samples processed by that tool including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Advantages: Inspection Speed

A significant advantage of this invention is that an extended source of X-rays can be used, increasing the available flux of X-rays used for imaging. This in turn increases the throughput possible for the system. Put another way, in the time to acquire a single inspection image with a PPM system, the proposed invention can acquire over 300,000 images with the same resolution.

Consider the following comparison with the PPM X-ray system. The time to acquire an image depends on the flux $\Phi$ of X-rays:

$$T_{acquire}=(P_{\#} \times X_P)/\Phi$$

where $P_{\#}$ is the number of pixels, $X_P$ is the number of X-rays per pixel, and $\Phi$ is the X-ray flux. The X-ray flux from a point source is:

$$\text{Flux}=\Phi=\beta \times \Omega \times S_A$$

where $\beta$ is the point source brightness, $\Omega$ is the angular distribution in mrad$^2$ and $S_A$ is the point source area $S_A=\pi r^2$. The source spot size for X-ray systems is typically defined using the ASTM standard SE-1165 ["Standard Test Method for Measurement of Focal Spots of Industrial X-ray Tubes by Pinhole Imaging," ASTM Committee E-7 on Nondestructive Testing, May 15, 1992].

A typical X-ray source brightness $\beta$ is $$\beta=10^8 \text{ X-rays/sec/mm}^2/\text{mrad}^2.$$

To avoid parallax errors in automated inspection, the PPM X-ray beam should be well collimated; a divergence of 20 mrad is typical. For a point source with $$\Omega=(20 \text{ mrad})^2=400 \text{ mrad}^2$$

and a source spot diameter d=2r=1 µm=$10^{-3}$ mm, the flux is given by:

$$\begin{aligned}
\text{Flux}=\Phi &= \beta \times \Omega \times S_A \\
&= 10^8 \times 400 \times \pi \times [0.5 \times 10^{-3}]^2 \text{ X-rays/sec} \\
&= 400 \times \pi \times 0.25 \times 10^8 \times [10^{-3}]^2 \text{ X-rays/sec} \\
&= 400 \times \pi \times 25 \text{ X-rays/sec} \\
&= 31{,}416 = 3.14 \times 10^4 \text{ X-rays/sec.}
\end{aligned}$$

A typical X-ray image sensor may have 512×512 pixels that need 1,000 X-rays/pixel for image formation. An image for a PPM system will therefore be collected in approximately 8,350 seconds, or 2.3 hours.

On the other hand, keeping the same source brightness, but illuminating with a larger source spot size according to the invention dramatically increases the X-ray flux illuminating the object. As an example, assume a source with a 1 mm diameter (r=0.5 mm) separated by 100 mm from the object and, furthermore, assume that the distance from the object to scintillator is 100 microns. The angular divergence of the X-ray beam is given by:

α=1 mm/100 mm=10 mrad, making

Ω=100 mrad².

The spot area is =π×[0.5]²=0.785 mm², so the flux becomes:

Flux = Φ = 10⁸ × 100 × 0.785 photons/sec

= 7.85 × 10⁹ photons/sec which is higher than the PPM configuration by a factor of 250,000 times. Therefore, the same 512×512 image (with 1,000 X-rays per pixel) can now be produced at high speed and, for example, may now have a proportionally faster image collection time of approximately 33 msec.

As a practical matter, the throughput enhancement may be further reduced by a factor of between 2 and 10 from this number. A PPM imaging system can detect X-rays in the enlarged shadow image directly with a CCD X-ray detector, which can have a quantum efficiency between 50% to 100%. The typical X-ray CCD array comprises an array of pixels, with a pixel size of approximately 100 μm×100 μm.

In comparison, the high-resolution direct-shadow images for the system of the disclosed invention come from an extended X-ray source, and are not magnified. The pixels of contemporary X-ray imaging detectors are far too large to resolve the proximity images. Instead, the invention disclosed here comprises a scintillator to convert the X-rays to optical photons, and then magnifies this optical image.

In order to achieve a particular resolution, there may be thickness specifications for the scintillator. For a resolution of 1 micron, for example, the scintillator may have a specified thickness between 1 and 10 microns. For thin scintillators, some of the incident X-rays will pass through the scintillator without being absorbed. Therefore, the quantum efficiency of this conversion process may worse than the PPM system, emitting visible photons for approximately 20% of the X-rays passing through the scintillator. Beyond this, the microscope may lose additional photons, depending on the optical system NA and the quantum efficiency of the visible CCD detector. However, even with these losses, the benefit provided by the higher flux of the extended source still provides a significant advantage.

Advantages: Imaging Resolution

The resolution of the prior art PPM system is determined by the spot size of the X-ray source. For example, a source with a 1 micron spot size will produce images with 1 micron resolution, assuming the system is operating at optimal resolution. Practically speaking, it is difficult to achieve resolution much below 1 micron with a PPM system, due to rapidly decreasing efficiency of the X-ray source for small spot sizes. As the spot size of the X-ray source decreases, the X-ray power must be reduced to avoid melting the X-ray target. Furthermore, the X-ray target must be made thinner, to reduce scattering in the target. As a result, for each 2× decrease in spot size, the flux from the source decreases a factor of about 2× to 4×. Overall, the throughput will decrease at least 8× for a 2× improvement in resolution.

For the imaging system according to the invention, the scintillator is in close proximity to the object being examined, and photons emitted are in proportion to the X-rays. For the optical system that relays the photons emitted by the scintillator to the detector, assuming a scintillator emission wavelength of λ=535 nm and a solid immersion optical system with NA=1.75 comprising LuAG optical elements with refractive index n=1.84, the definition for the diffraction-limited resolution R of the optical system relaying scintillator photons to the detector is:

$$R = \frac{\lambda}{2*NA} = \frac{535 \text{ nm}}{2*1.75} = 153 \text{ nm}$$

which is 6.5 times smaller than the 1 micron resolution of the PPM system.

Advantages: Time to Market

The high speed at which non-destructive images at resolutions smaller than 50 microns can be gathered can improve the time to market for the development of manufacturing processes such as the flip chip interconnect (FCI) process described earlier. The destructive processes for failure analysis, also described earlier, can take weeks to collect a single image, and months to acquire statistical data on parts. Because of the rapid time in which images can be collected and analyzed using the system of the present invention, process development time for such products can be counted in days, and is typically a fraction of the total time required to design and bring to market a new product.

Furthermore, because of the enhanced resolution, the present invention can be used for the new FCI processes with pitches smaller than 50 microns. The present invention can be used for significantly smaller pitches, and still maintain the desired image resolution and speed. In terms of the product development cycle, an increase in time for feedback of one to several weeks has a distinct and significant impact on the time required to develop a new product. In a simple case, perhaps three to five cycles of setup and data collection may be sufficient to establish a process for a new device. In a more complex case, such as a high-density interposer or a 3D IC, tens or hundreds of iterations may be required. Without the present invention, each of these cycles may take several weeks, and the total time to market of the product may come to be dominated by these cycles. Clearly a method of determining the quality of fine pitch (50 microns and smaller) bonds at the time of processing offers a significant advantage.

The images and calculations produced by the system and methods disclosed herewith allow the quality of bonds to be examined immediately after bonding in a matter of seconds or minutes. In order to develop and qualify a new semiconductor product for mass production, many individual processes and the integration of these processes must be established, tuned, and tested. In the case of forming a through-silicon via (TSV) in a semiconductor wafer, the process flow typically requires that the vias be formed first and the capture pads be subsequently formed on the wafer surface over the vias. Since the capture pads obscure optical inspection of the vias themselves, in the absence of the present invention, the alignment between the vias and the capture pads may not be accurately determined at the time of manufacturing without cutting the silicon wafer and inspecting this feature in cross-section. Since this procedure is time consuming and also destroys the silicon wafer and any economic value contained within it, it is therefore undesirable.

In the case of bonding two or more chips or substrates or even complete wafers together using FCI, the alignment, bonding force, bonding temperature, rate of heating, and rate of cooling among other factors must be tightly controlled.

While control of manufacturing equipment and processes can enable some of the necessary control, inspection and measurement of features within the product that are not optically visible may also be required. Without the use of the apparatus disclosed in this invention, assembled parts must be cross-sectioned in order to be inspected. Given the fine pitch of the interconnect bonds and the very large quantity of connections, this procedure can take several weeks. Typically only a very small subset of the total interconnect bonds may actually be inspected.

The inability to inspect bonds quickly can add significantly to the length of time required to fine tune both individual process steps as well as the integration of multiple process steps to create a finished product. For example, consider a case where 25 iterations of the bonding process are required to develop and qualify a product. In the case without the apparatus disclosed in this invention, each iteration may require 1 week to build each group of samples under various process and tooling configurations. After manufacturing a group of samples, an additional 2 weeks may be required to cross-section individual units and inspect the quality and attributes of the bonds that have been created. The total time is therefore: 25 cycles×(1 week making+2 weeks inspection)=75.0 weeks.

With the use of the apparatus disclosed in this invention, the 2 weeks of inspection can be reduced to a few minutes by eliminating the need for time consuming cross-sectioning. The total time for the sequential cycles may now be calculated as: 25 cycles×(1 week making+1 hour inspection) =25.15 weeks, a reduction by 49.85 weeks (or 66% of the initial time to market). With high-volume consumer electronic devices such as mobile phones selling in volumes of more than 100 million units a year, it can be easily seen that a decrease in time to market by 50 weeks (almost one year) can have significant impact on the market. The apparatus may further be integrated into the bonding tool or via filling tool, for example the electrochemical deposition tool, to provide feedback to the bonding process in real time. The use of the apparatus in this way reduces time to market by many weeks and may in fact enable a product to enter the market that otherwise would be too costly or too late to market to have economic value.

Advantages: Product Yield and Cost

It has been reported that commercial production began on these devices with overall yields related to package assembly and interconnect in the range of 80%. This yield is far lower than typically accepted in the semiconductor field, and there is considerable additional cost associated with the scrap material. However, this particular part was determined to have such high commercial value that, even considering the cost associated with low yield, it was commercially feasible to produce with only 80% package assembly yield. In other lower-cost, more consumer-oriented segments of the market, pressure on pricing is much more intense, and it is unlikely that a product with package assembly yields at this level could be commercially viable. For this reason, it is necessary for the manufacturing process to be highly capable and tightly controlled, such that the amount of scrap product or yield loss resulting from the bonding process is reduced. Traditionally, package assembly yields are in the 98 to 99% range. Those skilled in the art will quickly realize that scrapping good chips by using poorly yielding bonding techniques, and packaging yields of 80% for lower value chips, are simply not acceptable.

It should be noted that, in the case of multiple dice mounted together either as a 3D IC or onto a high-density interposer, the failure of one connection on any chip will result in the scrapping of the entire MCP or package assembly. There may be thousands or tens of thousands of connections that must all function as designed. It is rare that any kind of rework or recovery of materials can be accomplished if any of the bonds are not produced correctly. For example, take the case when a processor chip with a cost of $10 is mounted together with four memory chips costing $5 each, or $20. The total cost of the chips is therefore $30. Chip assembly and packaging may add another $5 of cost for a total assembly cost of $35.

By using the images and measurements produced by the apparatus in this disclosure, the processes of aligning, inspection bonding can be controlled and monitored such that the yield can be rapidly increased. For MCP packages, in the example above, detecting a flaw between the first two dice will allow the packaging assembler to scrap the first two die only, and not require the loss of all five dice, therefore saving scrap costs and improving yield. It is common for well-controlled and monitored assembly processes to have yields of over 99.9%. The present invention allows a packaging assembler to achieve a yield of greater than or equal to 90% in MCP structures having more than 4 dice and having more than 100 TSVs per interposer or die layer at pitches where the smallest pitch is less than 100 microns. The same yield advantage may be achieved in the flip chip configuration having more than 400 microbumps at a pitch where the smallest pitch is less than 100 microns.

This same advantage in cost and yield can be seen at other steps in the manufacturing process for fine-pitch interposers and 3D die stacking, such as via fill monitor for voids, via capture pad alignment to via, alignment of chip-bump to chip or interposer pad, and quality of completed joint after bonding. It may also be used to measure bondline in the assembly of multiple slices of silicon devices or fine pitch interposers or between silicon devices and other materials of interest where this bondline thickness is critical to device performance.

Miscellaneous.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an X-ray inspection system:
capturing one or more X-ray images for one or more samples of interest that have been processed by a first tool, wherein the X-ray inspection system is inline with the first tool, and wherein the X-ray inspection system has an inspection speed of 300 mm$^2$ per minute or greater;
determining, in real-time, metrology information related to the one or more samples of interest based on the one or more X-ray images, wherein the metrology information indicates that a sample parameter associated with the one or more samples of interest is outside of a pre-determined threshold range associated with the sample parameter; and
providing, responsive to the real-time determination that the sample parameter is outside of the pre-determined threshold range, instructions or data to the first tool or one or more second tools to adjust one or more process parameters associated with the respective first tool and the one or more second tools based on the metrology information related to the one or more samples of interest, wherein the adjusted process parameters reduces a processing error probability, of the respective first tool and the one or more second tools for processing subsequent samples, related to the sample parameter being outside of the pre-determined threshold range.

2. The method of claim 1, wherein the X-ray inspection system has an inspection speed of 1000 mm$^2$ per minute or greater.

3. The method of claim 1, wherein the X-ray inspection system has an inspection speed of 3000 mm$^2$ per minute or greater.

4. The method of claim 1, wherein the one or more X-ray images are captured with a field of view of 12 million pixels or greater.

5. The method of claim 1, wherein the metrology information determined based on the one or more X-ray images comprises measurement information associated with one or more structural features measured with a spatial resolution of 5 microns or less.

6. The method of claim 1, wherein the X-ray inspection system inspects the one or more samples of interest at a first speed faster than or equal to a second speed for the first tool or the one or more second tools to process the one or more samples of interest.

7. The method of claim 1, further comprising:
determining that the one or more samples of interest have one or more defects based on the metrology information, wherein the instructions or data provided to the first tool are generated based on the one or more defects of the one or more samples of interest.

8. The method of claim 1, wherein the one or more second tools are associated with one or more subsequent processes for processing or re-processing the one or more samples of interest and the subsequent samples.

9. The method of claim 8, further comprising:
determining that the one or more subsequent processes for processing the one or more samples of interest are redundant based on the metrology information related to the one or more samples of interest; and
providing instructions or data to the one or more second tools to exclude the one or more subsequent processes from a manufacturing process associated with the one or more samples of interest.

10. The method of claim 1, wherein the one or more samples of interest are inspected in situ to the first tool for processing the one or more samples of interest, and wherein the X-ray inspection system is integrated with the first tool.

11. The method of claim 1, wherein the metrology information determined based on the one or more X-ray images comprises one or more of:
shape information of solder balls;
dimensional information of solder balls;
defect information;
alignment information of an integrated circuit die to an interposer;
warpage information;
a uniformity metric associated with a solder contact external size;
a solder joint diameter;
a darkness metric of a contact pad area;
a uniformity metric for a darkness coverage of a contact pad area;
a continuous signal variation over a location of a contact pad;
a bright signal ring connecting a ball and solder;
a small dark and uniform coverage over the contact pad area;
parameter deviations from a product specification;
a tilt angle of a die with respect to an interposer; or
a tilt angle of a die with respect to a substrate.

12. The method of claim 11, wherein the metrology information is generated by a computer vision algorithm or a machine-learning model trained by historical data.

13. The method of claim 1, wherein the first tool is an assembling tool for assembling the one or more samples of interest and the subsequent samples.

14. The method of claim 13, wherein the assembling tool is a bonding tool comprising a placement tool and a mass reflow device.

15. The method of claim 13, wherein the assembling tool is a thermo-compression bonding tool or a hybrid bonding tool.

16. The method of claim 1, wherein the one or more process parameters of the first tool being adjusted comprise one or more of:
a chemical-mechanical polishing parameter;
an alignment of an integrated circuit die;
an alignment of an interposer;
a bonding force;
a bonding temperature;
a rate of heating;
a rate of cooling; or
a time duration after being assembled and before being heated.

17. The method of claim 1, wherein the one or more samples of interest are re-processed by the first tool to make one or more adjustments to the one or more samples of interest, and wherein the one or more adjustments to the one or more samples of interest are made based on the metrology information of the one or more samples of interest.

18. The method of claim 1, wherein the one or more samples inspected by the X-ray inspection system are of a subset of a sample population processed by the first tool.

19. One or more computer-readable non-transitory storage media embodying software that is operable when executed to:
- capture one or more X-ray images with an X-ray inspection system for one or more samples of interest that have been processed by a first tool, wherein the X-ray inspection system is inline with the first tool, and wherein the X-ray inspection system has an inspection speed of 300 mm$^2$ per minute or greater;
- determine, in real-time, metrology information related to the one or more samples of interest based on the one or more X-ray images, wherein the metrology information indicates that a sample parameter associated with the one or more samples of interest is outside of a pre-determined threshold range associated with the sample parameter; and
- provide, responsive to the real-time determination that the sample parameter is outside of the pre-determined threshold range, instructions or data to the first tool or one or more second tools to adjust one or more process parameters associated with the respective first tool and the one or more second tools based on the metrology information related to the one or more samples of interest, wherein the adjusted process parameters reduces a processing error probability, of the respective first tool and the one or more second tools for processing subsequent samples, related to the sample parameter being outside of the pre-determined threshold range.

20. A system comprising: one or more processors; and one or more computer-readable non-transitory storage media coupled to one or more of the processors and comprising instructions operable when executed by one or more of the processors to cause the system to:
- capture one or more X-ray images with an X-ray inspection system for one or more samples of interest that have been processed by a first tool, wherein the X-ray inspection system is inline with the first tool, and wherein the X-ray inspection system has an inspection speed of 300 mm$^2$ per minute or greater;
- determine, in real-time, metrology information related to the one or more samples of interest based on the one or more X-ray images, wherein the metrology information indicates that a sample parameter associated with the one or more samples of interest is outside of a pre-determined threshold range associated with the sample parameter; and
- provide, responsive to the real-time determination that the sample parameter is outside of the pre-determined threshold range, instructions or data to the first tool or one or more second tools to adjust one or more process parameters associated with the respective first tool and the one or more second tools based on the metrology information related to the one or more samples of interest, wherein the adjusted process parameters reduces a processing error probability, of the respective first tool and the one or more second tools for processing subsequent samples, related to the sample parameter being outside of the pre-determined threshold range.

* * * * *